United States Patent
Kondo et al.

(10) Patent No.: US 9,175,976 B2
(45) Date of Patent: Nov. 3, 2015

(54) LANE GUIDANCE DISPLAY SYSTEM, LANE GUIDANCE DISPLAY METHOD, AND LANE GUIDANCE DISPLAY PROGRAM

(71) Applicant: AISIN AW CO., LTD., Anjo-shi, Aichi-ken (JP)

(72) Inventors: Yoshito Kondo, Okazaki (JP); Ken Ishikawa, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/343,562

(22) PCT Filed: Oct. 24, 2012

(86) PCT No.: PCT/JP2012/006803
§ 371 (c)(1),
(2) Date: Mar. 7, 2014

(87) PCT Pub. No.: WO2013/065255
PCT Pub. Date: May 10, 2013

(65) Prior Publication Data
US 2014/0236473 A1    Aug. 21, 2014

(30) Foreign Application Priority Data

Nov. 2, 2011   (JP) ................................ 2011-241510

(51) Int. Cl.
*G01C 21/36*    (2006.01)
(52) U.S. Cl.
CPC ........ *G01C 21/3658* (2013.01); *G01C 21/3632* (2013.01); *G01C 21/3647* (2013.01)

(58) Field of Classification Search
USPC ........... 701/1, 23, 36, 41, 116, 400, 408, 409, 701/410, 428, 431, 436, 437, 439, 454, 457, 701/458, 459, 460, 466, 532, 538, 300; 340/988, 990, 995.1, 995.17, 995.19, 340/995.2, 995.26, 995.27
See application file for complete search history.

(56) References Cited

U.S. PATENT DOCUMENTS

| 8,239,131 B2 | 8/2012 | Kindo et al. |
| 2012/0191344 A1* | 7/2012 | Iao et al. ....................... 701/436 |
| 2013/0151145 A1* | 6/2013 | Ishikawa ....................... 701/428 |

FOREIGN PATENT DOCUMENTS

| CN | 101750069 A | 6/2010 |
| EP | 2 075 541 A1 | 7/2009 |

(Continued)

OTHER PUBLICATIONS

International Search Report issued in International Application No. PCT/JP2012/006803 mailed Feb. 4, 2013.
Written Opinion of the International Searching Authority issued in International Application No. PCT/JP2012/006803 mailed Feb. 4, 2013.

*Primary Examiner* — Thomas Tarcza
*Assistant Examiner* — Edward Pipala
(74) *Attorney, Agent, or Firm* — Oliff PLC

(57) ABSTRACT

A display control unit that causes a display unit to display a front image on which a guide line is superimposed, wherein the guide line has a front end point that indicates a position inside a recommended lane and has a rear end point that indicates a position rearward of the front end point, is provided. When the vehicle is in a lane change state, the display control unit sets a position of the rear end point in the front image such that the rear end point indicates a central position in a width direction of the vehicle, and, when the vehicle is not in the lane change state, the display control unit sets a position of the rear end point in the front image such that the rear end point indicates a central position in a width direction in the travelling lane.

11 Claims, 8 Drawing Sheets

(56) References Cited

FOREIGN PATENT DOCUMENTS

| | | |
|---|---|---|
| EP | 2 159 541 A1 | 3/2010 |
| JP | A-10-281795 | 10/1998 |
| JP | A-2005-214857 | 8/2005 |
| JP | 2006-284458 A | 10/2006 |
| JP | 2008-309529 A | 12/2008 |
| WO | WO 2009/149959 A1 | 12/2009 |

* cited by examiner

Fig. 2
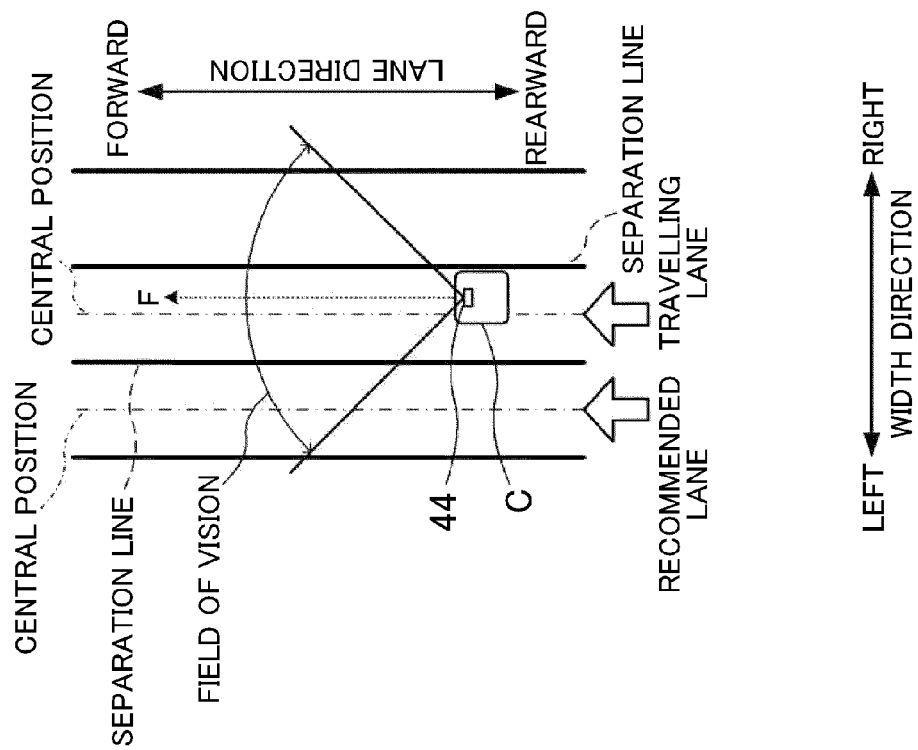
FIG. 2B
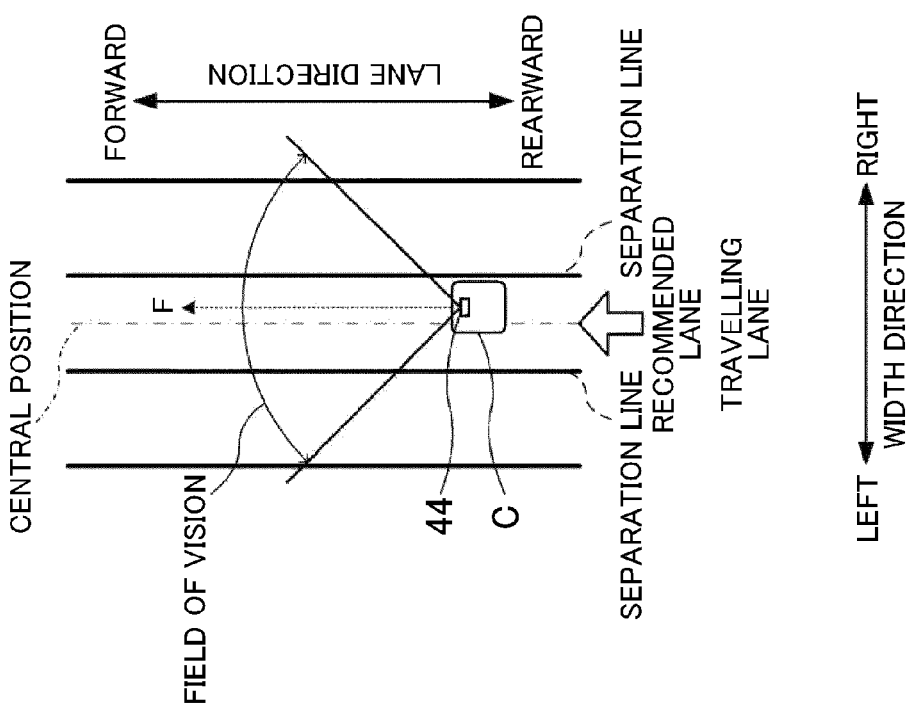
FIG. 2A

Fig. 3
FIG. 3A
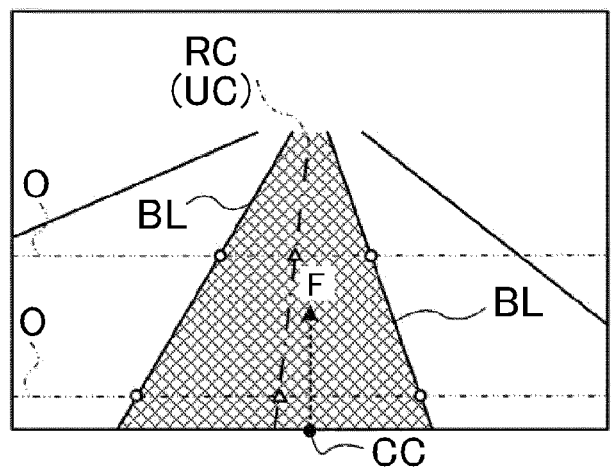
FIG. 3B
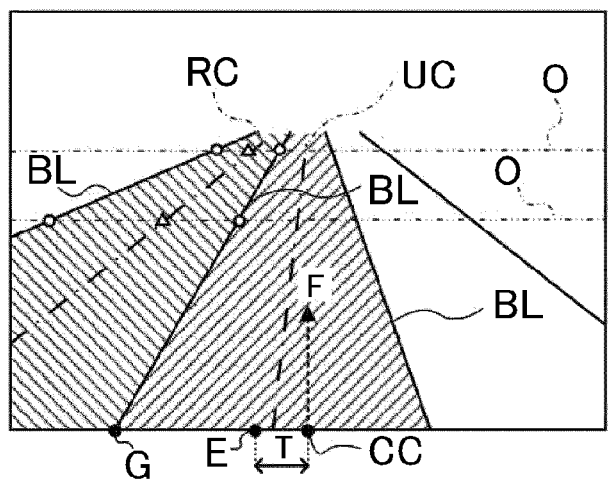
FIG. 3C
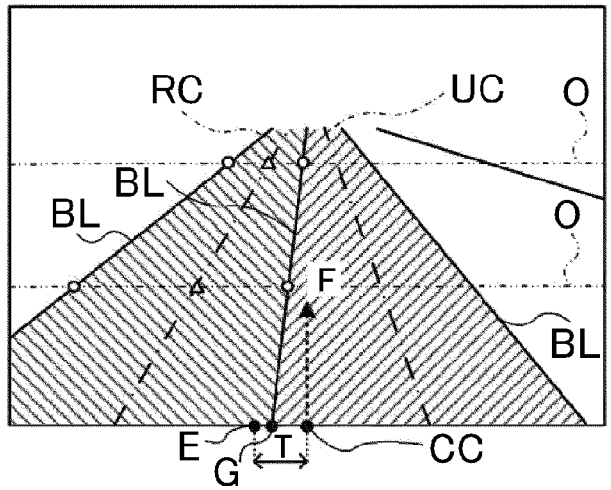

Fig. 4
FIG. 4A
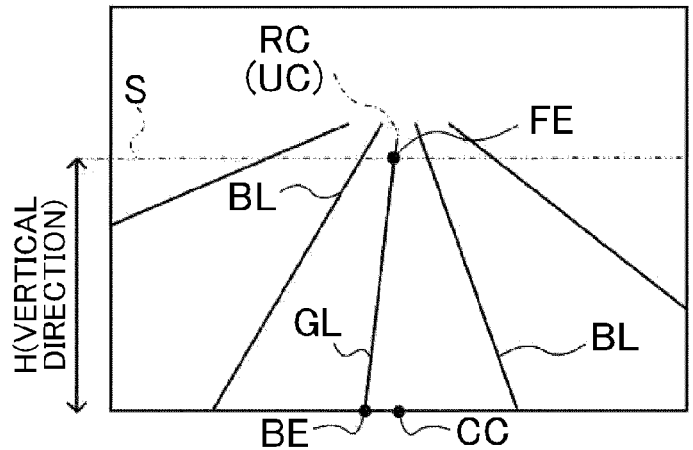
FIG. 4B
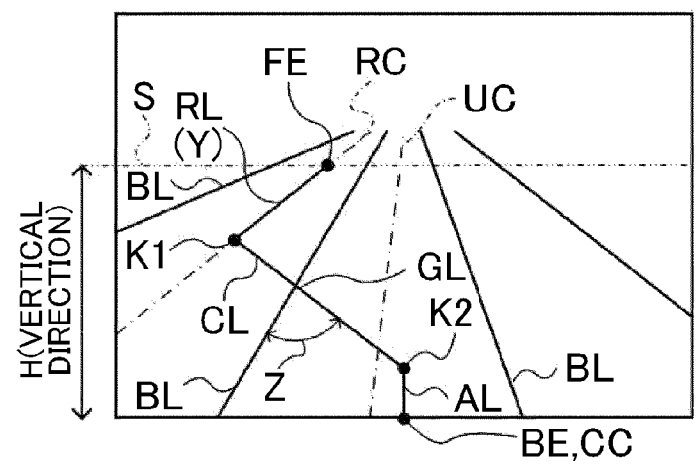
FIG. 4C
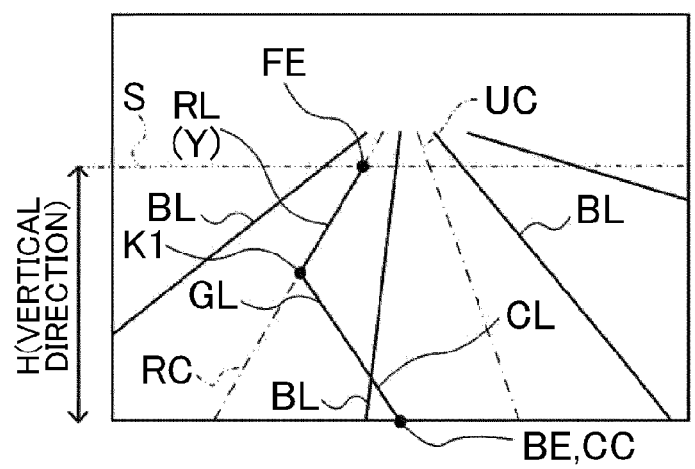

Fig. 5
FIG. 5A
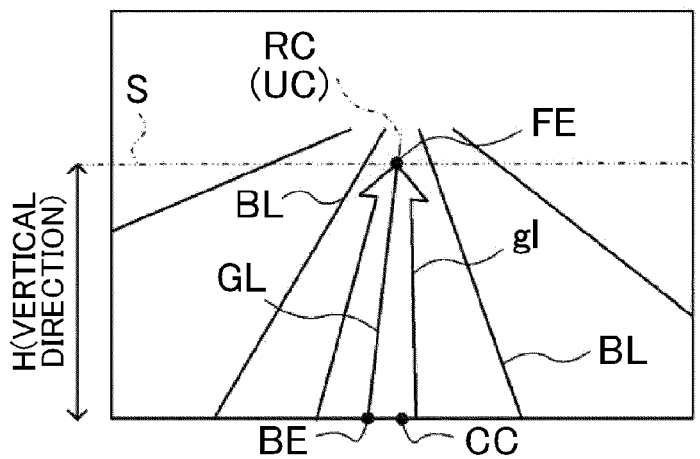
FIG. 5B
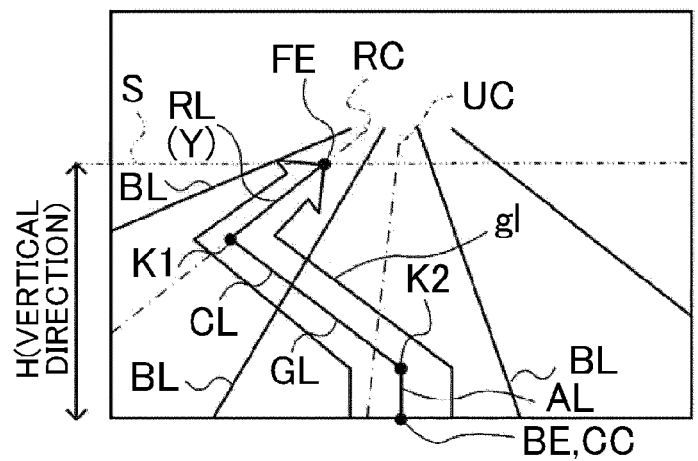
FIG. 5C
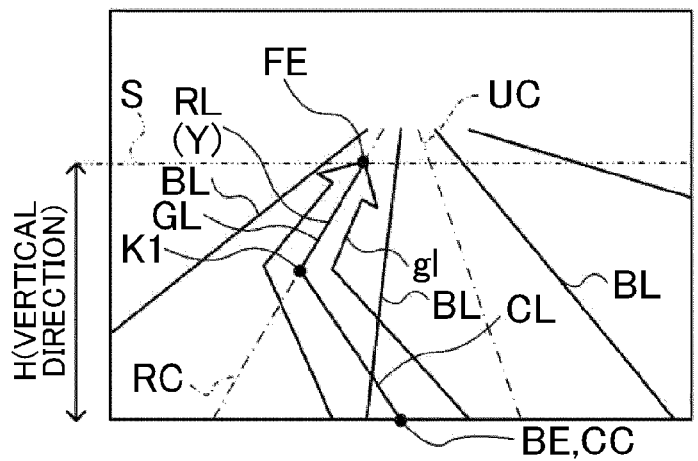

LANE GUIDANCE DISPLAY SYSTEM, LANE GUIDANCE DISPLAY METHOD, AND LANE GUIDANCE DISPLAY PROGRAM

TECHNICAL FIELD

The present invention relates to a lane guidance display system, lane guidance display method and lane guidance display program for displaying guidance on a recommended lane in which a vehicle should travel.

BACKGROUND ART

There is known an existing technique for displaying a front image obtained by capturing an area ahead of a vehicle such that an arrow, indicating a position of a recommended lane in which the vehicle should travel, is superimposed on the front image (see PTL 1 (Japanese Patent Application Publication No. 10-281795 (JP 10-281795 A))). In PTL 1, an arrow is superimposed on the front image such that the distal end of the arrow indicates the position of a node preset within a recommended lane in map information.

CITATION LIST

Patent Literature

PTL 1: Japanese Patent Application Publication No. 10-281795 (JP 10-281795 A)

SUMMARY OF INVENTION

Technical Problem

In PTL 1, the position of the distal end of the arrow in the front image depends on the position of the node in a lane direction of the recommended lane. Therefore, there is a problem that the position of the distal end of the arrow in the front image varies depending on the position of the node in the lane direction of the recommended lane and, as a result, it becomes difficult to recognize the position of the recommended lane, indicated by the distal end of the arrow.

The present invention is contemplated in view of the above inconveniences, and it is an object of the present invention to provide a technique for making it easy to recognize a position of a recommended lane, indicated by a distal end of a guide line.

Solution to Problem

In order to achieve the above-described object, in the present invention, a front image acquisition unit acquires a front image obtained by capturing an area ahead of a vehicle. A lane identification unit identifies a recommended lane in which the vehicle should travel in the front image. A display control unit generates a guide line that has a rear end point that indicates a position at which the vehicle is currently travelling as a rear-side end point and a front end point that indicates a position forward of the rear end point in the recommended lane as a front-side end point. Then, the display control unit causes the display unit to display the front image on which the generated guide line is superimposed. The display control unit also successively updates the front image on which the guide line is superimposed. In addition, the display control unit generates the guide line such that a position of the front end point in a vertical direction of the front image is kept constant.

In the above configuration, the display control unit keeps the position of the front end point constant in the vertical direction of the front image, so it is possible to prevent a vertical change in the position of the front end point in the front image. Thus, it is possible to make it easy to recognize the position of the recommended lane indicated by the front end point with the improved visibility of the front end point. The display control unit keeps the position of the front end point constant in the vertical direction of the front image, but it allows movement of the front end point in the horizontal direction of the front image. By so doing, the display control unit is able to set the position of the front end point in the front image such that the front end point indicates the position in the recommended lane. Note that the display unit is installed in the vehicle such that an image of the horizon is shown in the horizontal direction in the front image. In addition, the vertical position of the front image depends on a vertical position of a captured subject and a distance from a camera ahead of the vehicle. Furthermore, as the position of the front end point in the vertical direction of the front image becomes higher, the front end point is seen farther from the vehicle. Therefore, when the position of the front end point changes in the vertical direction of the front image, the driver experiences a feeling of strangeness that the position indicated by the front end point approaches or moves away. In contrast to this, by keeping the position of the front end point constant in the vertical direction of the front image, it is possible to prevent a feeling of strangeness that the position indicated by the front end point approaches or moves away.

The front image acquisition unit just needs to acquire a front image obtained by capturing an area ahead of the vehicle, and, for example, just needs to acquire the front image from a camera that includes an area ahead of the vehicle in its field of vision. In addition, the front image acquisition unit successively acquires a front image obtained by successively capturing an area ahead of the vehicle so that the display control unit is able to successively update the front image on which the guide line is superimposed. Note that an area ahead of the vehicle means an area ahead in a travelling direction of the vehicle. Particularly, when a front side in a lane is referred to, the front side means a front side in the travelling direction (lane direction) of the vehicle in that lane. In addition, the position of the front end point and the position of the rear end point respectively mean positions on the front image, and the position indicated by the front end point and the position indicated by the rear end point respectively mean positions in an actual space. Successively updating the front image may be updating the front image at a predetermined time interval or may be updating the front image at a predetermined travel distance of the vehicle. Furthermore, successively updating the front image may be updating the front image at an irregular interval.

The lane identification unit just needs to identify a lane in which the vehicle should travel as the recommended lane, and the recommended lane may be a lane along which the vehicle can reach a destination point in a scheduled travel route found in advance. Furthermore, when there is a lane that the vehicle should enter at an intersection ahead of the vehicle in the scheduled travel route, the lane identification unit may identify the lane as a recommended lane when the vehicle has approached the intersection within a predetermined distance. In addition, the lane identification unit may identify a lane, in which the vehicle is able to more safely or more smoothly travel than the other lanes, as a recommended lane on a travelling road on which the vehicle is travelling.

The display control unit just needs to generate a guide line that has the rear end point as a rear-side end point and the front end point as a front-side end point, and the guide line can be various linear shapes between the front end point and the rear end point. In addition, the guide line is not limited to a line that is continuous between the front end point and the rear end point, but it may be a broken line or a chain line. Furthermore, the guide line is not limited to a narrow line, but it may be a figure, such as an arrow, that connects the front end point to the rear end point in the front image. Here, the position at which the vehicle is currently travelling may be a position at which a travelling lane in which the vehicle is currently travelling is recognizable or may be, for example, a widthwise central position in the travelling lane. Furthermore, the position at which the vehicle is currently travelling may be a detailed position of the vehicle within the travelling lane in which the vehicle is currently travelling, may be, for example, a widthwise central position of the vehicle, a position of the eyepoint of the driver of the vehicle or may be a position at which a camera that captures a front image is provided in the vehicle.

When the vehicle is currently travelling in the travelling lane different from the recommended lane, the rear end point that indicates the position at which the vehicle is currently travelling is any position within the travelling lane. Thus, when the vehicle is currently travelling in the travelling lane different from the recommended lane, the guide line that connects the rear end point indicating a position within the travelling lane to the front end point indicating a position within the recommended lane includes a portion that indicates the position within the travelling lane and a portion that indicates the position within the recommended lane. When the length of the portion that indicates the position within the recommended lane in the front image is set so as to be larger than or equal to a predetermined value, it is possible to easily recognize the recommended lane. Therefore, the display control unit may generate the guide line as follows. That is, when the travelling lane is different from the recommended lane, the display control unit sets a first change point that indicates a position rearward of the front end point and forward of the rear end point. Furthermore, the display control unit generates the guide line that includes a recommended lane-side guide line portion that connects the first change point to the front end point. Then, the display control unit generates the guide line such that the length of the recommended lane-side guide line portion in the front image is kept longer than or equal to the predetermined value. By so doing, the length of the recommended lane-side guide line portion indicating the position within the recommended lane may be set longer than or equal to the predetermined value, so it is possible to easily recognize the recommended lane. Note that the display control unit may set a direction of the recommended lane-side guide line portion in the front image such that the direction of the recommended lane-side guide line portion indicates a lane direction of the recommended lane. By so doing, the driver is able to recognize the lane direction of the recommended lane. Note that the recommended lane-side guide line portion may be a straight line or a curve.

Furthermore, when the vehicle is currently travelling in the travelling lane different from the recommended lane, the guide line crosses an image of the separation line present between the travelling lane and the recommended lane in the front image. Here, in the front image, as the guide line crosses the image of the separation line present between the travelling lane and the recommended lane at an angle closer to a right angle, the driver is able to clearly recognize that a lane change should be made across the separation line present between the travelling lane and the recommended lane. Therefore, the display control unit may generate the guide line as follows.

That is, when the travelling lane is different from the recommended lane, the display control unit sets a second change point that indicates a position rearward of the first change point and forward of the rear end point within the travelling lane. Furthermore, the display control unit generates the guide line that includes the recommended lane-side guide line portion and a crossing line portion that connects the second change point to the first change point. Then, the display control unit generates the guide line such that an acute angle made between the image of the separation line present between the travelling lane and the recommended lane and a line that connects the first change point to the second change point in the front image is larger than or equal to a predetermined angle. By so doing, it is possible to set a relative position between the first change point and the second change point such that an acute angle made between the image of the separation line present between the travelling lane and the recommended lane and a line that connects the first change point to the second change point is an angle closer to a right angle than the predetermined angle. Therefore, the driver is able to clearly recognize that a lane change should be made across the separation line present between the travelling lane and the recommended lane by visually recognizing the crossing line portion that connects the first change point to the second change point. Note that the crossing line portion that connects the first change point to the second change point may be a straight line that connects the first change point to the second change point or may be a curve.

The acute angle means each of angles smaller than or equal to 90 degrees among angles formed around the intersection of the image of the separation line present between the travelling lane and the recommended lane and the line that connects the first change point to the second change point in the front image. The predetermined angle is desirably set to an angle close to a right angle such that the driver is able to easily recognize that the image of the separation line present between the travelling lane and the recommended lane crosses the line that connects the first change point to the second change point. Note that there is only one separation line present between a travelling lane and a recommended lane when the travelling lane and the recommended lane are next to each other in the width direction; however, there are a plurality of separation lines present between a travelling lane and a recommended lane when another lane is interposed between the travelling lane and the recommended lane. In this case, the display control unit may generate the guide line such that a minimum acute angle among acute angles at which respective images of a plurality of separation lines present between the travelling lane and the recommended lane cross a line that connects the first change point to the second change point is larger than or equal to the predetermined angle.

In addition, the display control unit may set the position of the front end point in the front image such that the front end point indicates a widthwise central position in the recommended lane, and may superimpose the guide line having an arrow shape that includes the front end point at an arrow head on the front image. When the front end point indicates the widthwise central position in the recommended lane, it is possible to make the front end point indicate a position farthest from the left and right separation lines of the recommended lane. Thus, it is possible to prevent confusion of the position indicated by the front end point with a position within another lane. Furthermore, by displaying the guide line having an arrow shape that includes the front end point at an arrow head, it is possible to clearly recognize that the vehicle should travel toward a position within the recommended lane. In this case, the display control unit may correct an arrow shape such that a difference between the width of a left gap formed between the arrow head and the image of the left separation line of the recommended lane in the front image and the width of a right gap formed between the arrow head and the image of the right separation line of the recommended lane in the front image reduces. By so doing, in the front image, it is possible to prevent offset of the arrow head toward one of the images of the left and right separation lines on the image of the recommended lane. Thus, for example, when the lane width of the recommended lane is narrow, it is possible to prevent interference of the arrow head with one of the images of the left and right separation lines of the recommended lane in the front image.

Specifically, the display control unit corrects the position of the front end point in the horizontal direction of the front image to reduce a difference between the width of the left gap formed between the arrow head and the image of the left separation line of the recommended lane in the front image and the width of the right gap formed between the arrow head and the image of the right separation line of the recommended lane in the front image. By so doing, even when the position of the front end point is corrected, it is possible to keep the position of the front end point constant in the vertical direction of the front image.

Furthermore, the display control unit may correct an inclination of the recommended lane-side guide line portion such that a difference between the width of a left gap formed between the arrow head and the image of the left separation line of the recommended lane in the front image and the width of a right gap formed between the arrow head and the image of the right separation line of the recommended lane in the front image reduces. By so doing, it is possible to reduce the difference between the width of a left gap formed between the arrow head and the image of the left separation line of the recommended lane in the front image and the width of a right gap formed between the arrow head and the image of the right separation line of the recommended lane in the front image without disturbing a balance between the left and right sides of the arrow head shape in the front image.

Furthermore, the display control unit may identify a central line that passes through a midpoint between the images of the left and right separation lines of the recommended lane in the horizontal direction of the front image and may set the position of the front end point at a position on the central line and at a set position in the vertical direction of the front image. In this way, the position of the front end point is set on the basis of the recognized images of the left and right separation lines of the recommended lane in the front image, so it is possible to set the position of the front end point such that the front end point follows a change in the front image updated successively. However, the position of the front end point is set to the set position in the vertical direction of the front image, so it is possible to keep the position of the front end point constant in the vertical direction of the front image.

Furthermore, as in the case of the present invention, the technique for guiding the position of the recommended lane through the guide line superimposed on the front image may also be applied as a program or a method. In addition, the above-described lane guidance display system, program and method may be implemented as a sole device or may be implemented by utilizing a component shared with various portions provided for a vehicle, and are implemented in various forms. That is, the units that constitute the lane guidance display system may be distributed to a plurality of hardware devices. When the units are distributed to a plurality of hardware devices, a communication unit that exchanges required data for causing the units to function may be provided. Furthermore, it is possible to provide a navigation system, a navigation method and a navigation program that are provided with at least part of the above-described lane guidance display system. In addition, the system described in the above embodiment may be modified where appropriate; for example, part of the system is software or part of the system is hardware. Furthermore, the aspect of the invention may be implemented as a storage medium storing a program that controls the lane guidance display system. It is a matter of course that the storage medium storing software may be a magnetic storage medium or may be a magnetooptical storage medium, and any storage media that will be developed in the future may also be used similarly.

BRIEF DESCRIPTION OF DRAWINGS

FIG. 2A and FIG. 2B are views that respectively illustrate lane change states;
FIG. 3A to FIG. 3C are views that respectively show front images;
FIG. 4A to FIG. 4C are views that respectively show narrow line-shaped guide lines;
FIG. 5A to FIG. 5C are views that respectively show arrow-shaped guide lines.

DESCRIPTION OF EMBODIMENTS

Figure 1:
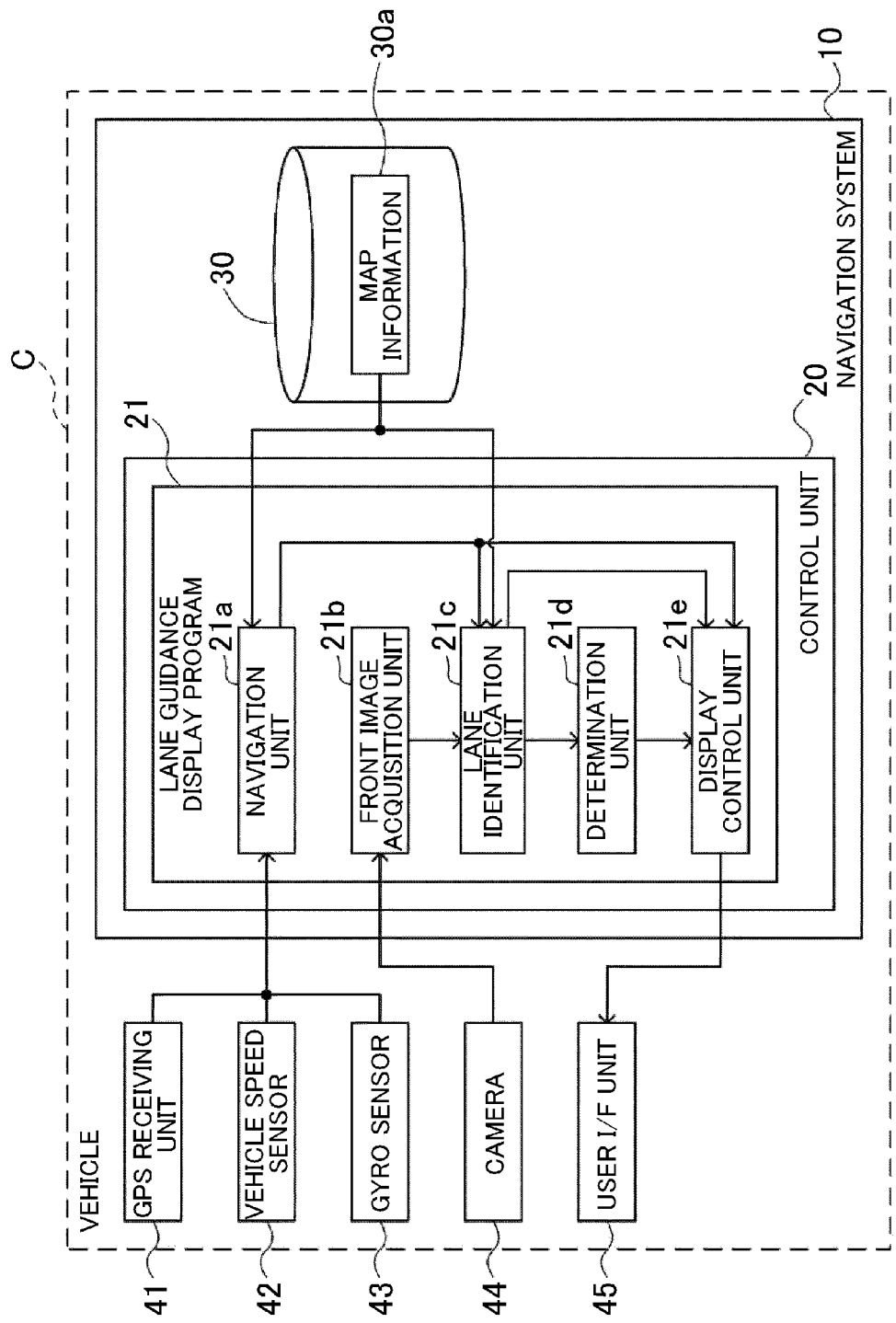
FIG. 1 is a block diagram of a navigation system.

Here, an embodiment of the present invention will be described in accordance with the following sequence.
(1) Configuration of Navigation System
(2) Lane Guidance Display Process
(3) Alternative Embodiments (1) Configuration of Navigation System FIG. 1 is a block diagram that shows the configuration of a navigation system 10 that serves as a lane guidance display system according to one embodiment of the invention. The navigation system 10 is mounted on a vehicle C. The navigation system 10 includes a control unit 20 and a storage medium 30. The control unit 20 includes a CPU, a RAM, a ROM, and the like, and executes programs stored in the storage medium 30 or the ROM. The storage medium 30 stores map information 30a. The map information 30a includes node data, link data, shape interpolation point data, object data, and the like. The node data indicate nodes set in correspondence with end points (intersections) of roads. The link data indicate information related to a road between the nodes. The shape interpolation point data are used to determine the shape of a road between the nodes. The object data indicate objects present on the roads or around the roads. The link data include lane information that indicates the number of lanes included in a road, a lane number of each lane on a road, counted from one side (left side in the present embodiment) in the width direction, a road that may be entered when the vehicle travels in a lane to the end of a road and a line type (line shape, color, and the like) of a separation line that separates a lane.

In addition, the vehicle C includes a GPS receiving unit 41, a vehicle speed sensor 42, a gyro sensor 43, a camera 44 and a user I/F unit 45. The GPS receiving unit 41 receives electric waves from GPS satellites and outputs a signal for calculating a current position of the vehicle C through an interface (not shown). The vehicle speed sensor 42 outputs a signal corresponding to the rotation speed of wheels equipped for the vehicle C. The gyro sensor 43 outputs a signal corresponding to an angular acceleration of the vehicle C. The camera 44 is an image sensor that captures a front image ahead of the vehicle C.

FIG. 2A and FIG. 2B are plan views that respectively show states where the camera 44 captures a front image. As shown in FIG. 2A and FIG. 2B, the camera 44 captures a front image that shows a downward view ahead of the vehicle C in addition to the field of vision ahead of the vehicle C. The front image captured by the camera 44 is output to the control unit 20 via an interface (not shown). In the present embodiment, the camera 44 is provided on the back side of a rear-view mirror at the widthwise central position of the vehicle C. The user I/F unit 45 includes an output device that outputs various pieces of guidance on the basis of control signals output from the control unit 20. The output device of the user I/F unit 45 according to the present embodiment includes a speaker that outputs guidance by voice and a display that serves as a display unit and that displays guidance by image. The display is installed in an orientation in which the driver of the vehicle C is able to visually recognize the display. The display is installed such that the vertical direction and horizontal direction of an image displayed on the display respectively correspond to the vertical direction and horizontal direction of the vehicle C. In addition, in the present embodiment, lane directions of respective lanes captured by the camera 44 all are straight and parallel to each other.

A lane guidance display program 21 includes a navigation unit 21a, a front image acquisition unit 21b, a lane identification unit 21c, a determination unit 21d and a display control unit 21e. The navigation unit 21a is a module that causes the control unit 20 to execute various functions required to guide the vehicle to a destination along a scheduled travel route. With the use of the function of the navigation unit 21a, the control unit 20 identifies the current position of the vehicle C on the basis of, for example, signals output from the GPS receiving unit 41, the vehicle speed sensor 42 and the gyro sensor 43. Then, with the use of the function of the navigation unit 21a, the control unit 20 consults the link data of the map information 30a to identify a road, on which the current position of the vehicle C is present, as a travel road. In addition, with the use of the function of the navigation unit 21a, the control unit 20 consults the map information 30a to search for a scheduled travel route from the current position to the destination through a known route search method. In the present embodiment, it is assumed that the scheduled travel route is found in advance. Note that, with the use of the function of the navigation unit 21a, the control unit 20 just needs to be able to acquire a scheduled travel route and may acquire a scheduled travel route found by an external computer through communication.

The front image acquisition unit 21b is a module that causes the control unit 20 to execute the function of acquiring a front image obtained by capturing an area ahead of the vehicle C. That is, with the use of the function of the front image acquisition unit 21b, the control unit 20 successively acquires front image data captured by the camera 44 at predetermined time intervals.

FIG. 3A to FIG. 3C are views that respectively show front images. When the vehicle C travels horizontally, the vertical upper side on a bisector that transversely bisects a front image indicates a forward position F ahead of the camera 44 (the widthwise central position of the vehicle C). Note that a vanishing point is present on the bisector that transversely bisects the front image. When the vehicle C travels horizontally, the transverse position of the front image corresponds to the horizontal position in the field of vision of the camera 44, and particularly corresponds to a position in the lane width direction in a lane. On the other hand, the vertical position of the front image depends on a vertical position in the field of vision and a distance from the camera 44. Thus, as the vertical position of the front image becomes higher, it indicates a farther position ahead in a travelling direction of the vehicle C. In the present embodiment, it is assumed that the midpoint CC of the lower side of the front image indicates the widthwise central position of the vehicle C.

The lane identification unit 21c is a module that causes the control unit 20 to execute the function of identifying a travelling lane in which the vehicle C is currently travelling and a recommended lane in which the vehicle C should travel in the front image. That is, with the use of the function of the lane identification unit 21c, the control unit 20 recognizes images of lane separation lines from the front image through a known line recognition method, such as Hough transform, and identifies areas separated by the images of the separation lines as images of lanes. Note that, with the use of the function of the lane identification unit 21c, the control unit 20 may consult line types of separation lines, indicated by lane information of the map information 30a, to recognize images of separation lines. Furthermore, with the use of the function of the lane identification unit 21c, the control unit 20 identifies the image of the lane closest from the midpoint CC of the lower side of the front image among the images of the lanes as the image of a travelling lane. In addition, with the use of the function of the lane identification unit 21c, the control unit 20 counts from the image of the left-end lane to the image of the travelling lane in the front image to identify a lane number of the travelling lane.

In addition, with the use of the function of the lane identification unit 21c, the control unit 20 identifies a recommended lane on the basis of the scheduled travel route found in advance with the use of the function of the navigation unit 21a. That is, with the use of the function of the lane identification unit 21c, the control unit 20 identifies a road on which the vehicle C should travel subsequently to the currently travelling road in the scheduled travel route, and identifies a lane, which allows the vehicle C to enter the subsequent road, as a recommended lane. Then, with the use of the function of the lane identification unit 21c, the control unit 20 identifies the image of the lane obtained by counting by the lane number of the recommended lane sequentially from the image of the left-end lane in the front image as the image of the recommended lane.

The determination unit 21d is a module that causes the control unit 20 to execute the function of determining whether the vehicle C is in a lane change state where the vehicle C makes a lane change from the travelling lane to the recommended lane. With the use of the function of the determination unit 21d, the control unit 20 determines that the vehicle C is in the lane change state when the travelling lane identified with the use of the function of the lane identification unit 21c is different from the recommended lane, that is, the lane number of the recommended lane is not equal to the lane number of the travelling lane.

FIG. 2A shows an example in the case where the travelling lane and the recommended lane both are a central lane among three lanes that constitute a travelling road and the vehicle C is not in the lane change state. Hereinafter, the case where the vehicle C is not in the lane change state is referred to as lane keeping state. FIG. 2B shows an example in the case where the travelling lane is a central lane and the recommended lane is a left-end lane among three lanes that constitute a travelling road and the vehicle C is in the lane change state. FIG. 3A shows a front image in the case of FIG. 2A. FIG. 3B shows a front image in the case of FIG. 2B. In the front image of FIG. 3B, the image of the central lane is the image of the travelling lane (upward-sloping hatching), and the image of the left-end lane is the image of the recommended lane (downward-sloping hatching). On the other hand, in the front image of FIG. 3A, the image of the central lane is the image of the travelling lane and is the image of the recommended lane (cross hatching).

Furthermore, in the case of the lane change state, with the use of the function of the determination unit 21d, the control unit 20 determines whether the vehicle C is crossing the separation line between the recommended lane and the travelling lane, of the separation lines of the travelling lane. With the use of the function of the determination unit 21d, the control unit 20 identifies a position, offset by a predetermined distance T from the midpoint CC of the lower side of the front image toward the image of the recommended lane, on the lower side as a wheel point E that indicates the position of the wheels closer to the recommended lane. Note that the predetermined distance T corresponds to half the width of the vehicle C. With the use of the function of the determination unit 21d, the control unit 20 determines that the vehicle C is not crossing the separation line between the recommended lane and the travelling lane, of the separation lines of the travelling lane when the wheel point E is located in the image of the travelling lane with respect to a position G of the intersection of the image BL of the separation line between the image of the recommended lane and the image of the travelling lane, of the images BL of the separation lines of the travelling lane, and the lower side of the front image (FIG. 3B). Note that the state where the vehicle C is not crossing the separation line between the recommended lane and the travelling lane, of the separation lines of the travelling lane is referred to as pre-start state. On the other hand, with the use of the function of the determination unit 21d, the control unit 20 determines that the vehicle C is crossing the separation line between the recommended lane and the travelling lane, of the separation lines of the travelling lane when the wheel point E is equal to the position G of the intersection of the image BL of the separation line between the image of the recommended lane and the image of the travelling lane, of, the images BL of the separation lines of the travelling lane, and the lower side of the front image or is located on the image of the recommended lane with respect to the position G of the intersection (FIG. 3C). Note that the state where the vehicle C is crossing the separation line between the recommended lane and the travelling lane, of the separation lines of the travelling lane is referred to as post-start state. In addition, with the use of the function of the determination unit 21d, the control unit 20 determines that the vehicle C is in the post-start state from when the vehicle C initially crosses the separation line between the recommended lane and the travelling lane, of the separation lines of the travelling lane until a lane change to the recommended lane is completed. With the use of the function of the determination unit 21d, the control unit 20 may determine that a lane change is completed on the basis of the fact that, for example, the vehicle C travels within a predetermined distance from the central position of the recommended lane in the width direction. With the use of the function of the determination unit 21d, the control unit 20 determines that the vehicle C is in the lane keeping state when the lane change is completed.

The display control unit 21e is a module that causes the control unit 20 to execute the function of generating a guide line, superimposing the generated guide line on the front image and causing the user I/F unit 45 to display the generated guide line continuously. Specifically, with the use of the function of the display control unit 21e, the control unit 20 executes the process of causing the user I/F unit 45 to display a front image on which the guide line is superimposed each time the front image is acquired at a predetermined time interval. Note that, in any front image captured at any time interval, the midpoint CC of the lower side of the front image constantly indicates the widthwise central position of the vehicle C. In addition, when the vehicle C moves in the lane width direction, the images of the separation lines of the lanes move horizontally in the front image.

With the use of the function of the display control unit 21e, the control unit 20 generates a guide line that has a rear end point indicating a position at which the vehicle C is currently travelling as a rear end point and a front end point indicating a position forward of the rear end point in the recommended lane as a front end point. Hereinafter, the points that constitute the guide line will be described in detail.

TABLE 1

| State of Vehicle | Not Lane Change State (Lane Keeping State) | Lane Change State | |
|---|---|---|---|
| | | Pre-start State | Post-start State |
| Front End Point | Widthwise Central Position in Recommended Lane | Widthwise Central Position in Recommended Lane | Widthwise Central Position in Recommended Lane |
| Rear End Point | Widthwise Central Position in Travelling Lane | Widthwise Central Position of Vehicle | Widthwise Central Position of Vehicle |
| First Change Point | None | Rearward of Front End Point and Forward of Rear End Point in Recommended Lane (Length of Recommended Lane-side Straight Portion Is Set to Predetermined Value) | Rearward of Front End Point and Forward of Rear End Point in Recommended Lane (Length of Recommended Lane-side Straight Portion Is Set to Predetermined Value) |

TABLE 1-continued

| State of Vehicle | Not Lane Change State (Lane Keeping State) | Lane Change State | |
|---|---|---|---|
| | | Pre-start State | Post-start State |
| Second Change Point | None | Rearward of First Change Point and Forward of Rear End Point in Travelling Lane (Acute Angle Is Set to Predetermined Angle) | None |

Table 1 shows positions indicated by the points that constitute the guide line in an actual space. As shown in Table 1, in any of the pre-start state and post-start state of the lane change state and the lane keeping state, with the use of the function of the display control unit 21e, the control unit 20 sets a front end point in the front image such that the front end point indicates the widthwise central position in the recommended lane.

With the use of the function of the display control unit 21e, the control unit 20 identifies a central line RC (alternate long and short dash line) that passes the midpoints between the images BL of the left and right separation lines of the recommended lane in the horizontal direction on the front image. With the use of the function of the display control unit 21e, the control unit 20 identifies midpoints (white triangles) in the horizontal direction between intersections (white circles) of horizontal auxiliary lines O (alternate long and two short dashes lines) and the images BL of the left and right separation lines of the recommended lane on the front image as shown in FIG. 3A to FIG. 3C, and determines that the midpoints indicate the widthwise central positions in the recommended lane. With the use of the function of the display control unit 21e, the control unit 20 identifies midpoints (white triangles) in the horizontal direction between the images BL of the left and right separation lines of the recommended lane for each of two or more auxiliary lines O having different positions in the vertical direction, and identifies a line that connects the midpoints (white triangles) as a central line RC that indicates the widthwise central positions in the recommended lane. Note that, when the recommended lane is not straight, a midpoint (white triangle) in the horizontal direction between the images BL of the left and right separation lines of the recommended lane may be identified for each of three or more auxiliary lines O, and a curve or a polygonal line that connects the midpoints (white triangles) may be identified as a central line RC.

FIG. 4A to FIG. 4C are views that respectively show states where a front end point is set in each of the front images of FIG. 3A to FIG. 3C. With the use of the function of the display control unit 21e, the control unit 20 sets a front end point FE at a position on the central line RC of the recommended lane in the front image and at a set position H in the vertical direction on the front image. As shown in FIG. 4A to FIG. 4C, in any of the pre-start state and post-start state of the lane change state and the lane keeping state, with the use of the function of the display control unit 21e, the control unit 20 generates an auxiliary line S in the horizontal direction at the set position H in the vertical direction on the front image, and sets the front end point FE at the intersection of the auxiliary line S and the central line RC of the recommended lane. Thus, in any of the pre-start state and post-start state of the lane change state and the lane keeping state, the front end point indicates a position inside the recommended lane. In addition, the set position H is not dependent on the front image.

As shown in Table 1, with the use of the function of the display control unit 21e, the control unit 20 sets the position of the rear end point in the front image such that the rear end point indicates the widthwise central position in the travelling lane in the lane keeping state. With the use of the function of the display control unit 21e, the control unit 20 identifies a central line UC (alternate long and short dash line) that passes through midpoints between the images BL of the left and right separation lines of the travelling lane in the front image. However, as shown in FIG. 3A, the travelling lane coincides with the recommended lane in the lane keeping state, so the central line UC of the travelling lane coincides with the central line RC of the recommended lane identified at the time of setting the front end point FE. As shown in FIG. 4A, in the lane keeping state, with the use of the function of the display control unit 21e, the control unit 20 sets a rear end point BE at the intersection of the central line UC of the travelling lane and the lower side of the front image. Note that in the lane keeping state in which no lane change is performed, it is presumable that the vehicle C travels substantially the widthwise central position in the travelling lane. Thus, it is presumable that, in the lane keeping state, the rear end point BE set on the central line UC of the travelling lane at the lower side of the front image indicates the position at which the vehicle C is currently travelling.

As shown in Table 1, with the use of the function of the display control unit 21e, the control unit 20 sets a rear end point in the front image such that the rear end point indicates the widthwise central position of the vehicle C in each of the pre-start state and post-start state of the lane change state. As described above, the midpoint CC of the lower side of the front image indicates the widthwise central position of the vehicle C. Thus, as shown in FIG. 4B and FIG. 4C, in any of the pre-start state and the post-start state, with the use of the function of the display control unit 21e, the control unit 20 sets the rear end point BE at the midpoint CC of the lower side of the front image.

As shown in Table 1, with the use of the function of the display control unit 21e, the control unit 20 sets only the front end point FE and the rear end point BE without setting a first change point and a second change point in the lane keeping state. As shown in FIG. 4A, with the use of the function of the display control unit 21e, the control unit 20 generates a linear and narrow line-shaped guide line GL that connects the front end point FE to the rear end point BE in the lane keeping state.

On the other hand, as shown in Table 1, with the use of the function of the display control unit 21e, the control unit 20 sets a first change point and a second change point in the pre-start state of the lane change state, and sets a first change point in the post-start state of the lane change state. As shown in FIG. 4B and FIG. 4C, in the pre-start state and post-start state of the lane change state, with the use of the function of the display control unit 21e, the control unit 20 sets a first change point K1 that indicates a position rearward of the front end point FE and forward of the rear end point BE within the recommended lane. Specifically, with the use of the function of the display control unit 21e, the control unit 20 sets the first change point K1 at a position vertically downward of the front end point FE and vertically upward of the lower side of the front image on the central line RC of the recommended lane in the front image. Furthermore, with the use of the function of the display control unit 21e, the control unit 20 sets the first change point K1 such that the length of a recommended lane-side guide line portion RL that connects the front end point FE to the first change point K1 is equal to a predetermined value Y. Note that the predetermined value Y is not dependent on the front image. Note that the recommended lane-side guide line portion RL is a line on the central line RC of the recommended lane, so the recommended lane-side guide line portion RL indicates the lane direction of the recommended lane.

As shown in Table 1, with the use of the function of the display control unit 21e, the control unit 20 does not set a second change point in the post-start state of the lane change state. As shown in FIG. 4C, with the use of the function of the display control unit 21e, the control unit 20 generates a polygonal and narrow line-shaped guide line GL that connects the front end point FE, the first change point K1 and the rear end point BE in the post-start state of the lane change state. In this case, the guide line GL includes a recommended lane-side guide line portion RL between the front end point FE and the first change point K1 and a crossing line portion CL between the first change point K1 and the rear end point BE. Note that the crossing line portion CL may be a straight line or curve that connects the first change point K1 to the rear end point BE. In addition, the recommended lane-side guide line portion RL just needs to be entirely present inside the image of the recommended lane and may be a curve.

As shown in FIG. 4B, in the pre-start state of the lane change state, with the use of the function of the display control unit 21e, the control unit 20 sets a second change point K2 that indicates a position rearward of the first change point K1 and forward of the rear end point BE within the travelling lane. That is, with the use of the function of the display control unit 21e, the control unit 20 sets, in the front image, the second change point K2 at a position vertically downward of the first change point K1 and vertically upward of the lower side of the front image. In addition, with the use of the function of the display control unit 21e, the control unit 20 equalizes an acute angle Z made between the image BL of the separation line between travelling lane and the recommended lane and a line (crossing line portion CL) that connects the first change point K1 to the second change point K2 in the front image to a predetermined angle. In the present embodiment, with the use of the function of the display control unit 21e, the control unit 20 sets a second change point K2 on a bisector that transversely bisects the front image. That is, the second change point K2 is set so as to indicate the position of the forward position F ahead of the widthwise central position of the vehicle C. In addition, the predetermined angle is not dependent on the front image. It is more desirable that the predetermined angle is close to 90 degrees. In the present embodiment, the predetermined angle is 60 degrees. The acute angle Z indicates each of two angles smaller than 90 degrees among four angles formed around the intersection of the image BL of the separation line present between the travelling lane and the recommended lane and a line (crossing line portion CL) that connects the first change point K1 to the second change point K2.

As shown in FIG. 4B, with the use of the function of the display control unit 21e, the control unit 20 generates a polygonal and narrow line-shaped guide line GL that connects the front end point FE, the first change point K1, the second change point K2 and the rear end point BE in the pre-start state of the lane change state. In this case, the guide line GL includes a recommended lane-side guide line portion RL between the front end point FE and the first change point K1, a crossing line portion CL that connects the first change point K1 to the second change point K2 and an adjacent portion AL between the second change point K2 and the rear end point BE. Note that the crossing line portion CL in the pre-start state may also be a straight line or curve that connects the first change point K1 to the second change point K2.

With the use of the function of the display control unit 21e, the control unit 20 generates an arrow-shaped guide line gl on the basis of the narrow line-shaped guide line GL. FIG. 5A to FIG. 5C are views that respectively show states where an arrow-shaped guide line gl is drawn on the basis of each of the narrow line-shaped guide lines GL in FIG. 4A to FIG. 4C. In the present embodiment, the arrow-shaped guide line gl is generated so as to be symmetrical with respect to the narrow line-shaped guide line GL. The head of the arrow is triangular, and the vertex of the triangle corresponds to the front end point FE. In the present embodiment, "a vertex" denotes the corner corresponding to the vertex angle of an isosceles triangle and "a base vertex" denotes one of the corners corresponding to the base angles of an isosceles triangle.

With the use of the function of the display control unit 21e, the control unit 20 causes the user I/F unit 45 to display the front image on which the arrow-shaped guide line gl is superimposed. With the use of the function of the display control unit 21e, for each of front images acquired successively at time intervals, the control unit 20 generates an arrow-shaped guide line gl in synchronization with the front image and successively updates the front image on which the arrow-shaped guide line gl is superimposed.

In the above configuration, with the use of the function of the display control unit 21e, the control unit 20 keeps the position of the front end point FE in the vertical direction of the front image at the set position H, so it is possible to prevent a vertical change in the position of the front end point FE of the guide line gl in the front image. Thus, it is possible to make it easy to recognize the position of the recommended lane indicated by the front end point FE of the guide line gl. That is, by keeping the position of the front end point FE constant in the vertical direction of the front image, it is possible to prevent such a feeling of strangeness that the position indicated by the front end point FE approaches or moves away.

In addition, with the use of the function of the display control unit 21e, the control unit 20 generates a guide line gl such that the length of the recommended lane-side guide line portion RL in the front image is kept at the predetermined value Y. By so doing, it is possible to ensure the predetermined value Y for the length of the recommended lane-side guide line portion RL that indicates the position inside the recommended lane, so it is possible to make it easy to recognize the recommended lane. Note that, with the use of the function of the display control unit 21e, the control unit 20 sets the direction of the recommended lane-side guide line portion RL in the same direction as that of the central line RC of the recommended lane in the front image. By so doing, the driver is able to easily recognize the lane direction of the recommended lane.

Furthermore, with the use of the function of the display control unit 21e, the control unit 20 generates the guide line gl such that the acute angle Z made between the image BL of the separation line present between the travelling lane and the recommended lane and a line (crossing line portion CL) that connects the first change point K1 to the second change point K1 in the front image is larger than or equal to the predetermined angle (60 degrees). By so doing, it is possible to set the acute angle Z made between the image BL of the separation line present between the travelling lane and the recommended lane and the line (crossing line portion CL) that connects the first change point K1 to the second change point K2 to an angle closer to a right angle than the predetermined angle, and the driver is able to clearly recognize that a lane change should be made across the separation line present between the travelling lane and the recommended lane.

Furthermore, in each of the pre-start state and post-start state of the lane change state, with the use of the function of the display control unit 21e, the control unit 20 sets the position of the rear end point BE in the front image such that the rear end point BE indicates the widthwise central position of the vehicle C. By so doing, it is possible for the rear end point BE of the guide line gl to constantly indicate the widthwise central position of the vehicle C in the front image. Thus, it is possible to vary the position indicated by the rear end point BE of the guide line gl such that the position indicated by the rear end point BE follows the widthwise central position of the vehicle C, which varies with a lane change. That is, it is possible to move the position indicated by the rear end point BE of the guide line gl from the image of the travelling lane to the image of the recommended lane in the front image following the widthwise central position of the vehicle C that moves from the travelling lane side to the recommended lane side with a lane change. Thus, it is possible to superimpose the guide line gl appropriate to the progress of a lane change on the front image. Note that, in the present embodiment, in the lane change state, the absolute position of the rear end point BE in the front image is fixed at the midpoint CC of the lower side, but the rear end point BE relatively moves with respect to the images of the travelling lane and recommended lane such that the rear end point BE follows the widthwise central position of the vehicle C. By making a comparison between FIG. 5B and FIG. 5C that respectively show the front images in the lane change state, the image BL of the separation line of the travelling lane and the image BL of the separation line of the recommended lane is shifted more rightward with respect to the midpoint CC in FIG. 5C than in FIG. 5B, and the driver is able to recognize that the widthwise central position of the vehicle C is varying in the lane change state.

On the other hand, not in the lane change state but in the state where the vehicle C continuously travels in the travelling lane, when the widthwise central position of the vehicle C varies, it may be assumed that the position in the width direction of the vehicle C is just varied due to sway of the vehicle C, which is not intended by the driver. In this way, when the position in the width direction, indicated by the rear end point BE of the guide line gl, varies following sway of the vehicle C, which is not intended by the driver, the driver is unnecessarily alerted. Then, with the use of the function of the display control unit 21e, the control unit 20 sets the position of the rear end point BE in the front image such that the rear end point BE indicates the widthwise central position in the travelling lane in the case where the vehicle C is not in the lane change state. By so doing, it is possible for the rear end point BE not to approach or move away from the images BL of the separation lines of the travelling lane following sway of the vehicle C, so it is possible to prevent the driver from being unnecessarily alerted.

In addition, with the use of the function of the determination unit 21d, the control unit 20 determines that the vehicle C is in the lane change state when the travelling lane is different from the recommended lane. By so doing, in synchronization with the timing at which a change occurs from the state where the front end point FE and the rear end point BE indicate positions in the same lane to the state where the front end point FE and the rear end point BE indicate positions in different lanes, it is possible to vary the position indicated by the rear end point BE from the widthwise central position in the travelling lane to the widthwise central position of the vehicle C. Thus, it is possible to make it hard for the driver to recognize a variation in the position of the rear end point on the front image, so it is possible to prevent a feeling of strangeness experienced by the driver.

Furthermore, with the use of the function of the display control unit 21e, the control unit 20 identifies a central line RC that passes through the midpoints between the images of the left and right separation lines of the recommended lane in the horizontal direction of the front image, and sets the position of the front end point FE to a position on the central line RC of the recommended lane in the front image at a set position H in the vertical direction of the front image. In this way, the position of the front end point FE is set on the basis of the recognized images BL of the left and right separation lines of the recommended lane in the front image, so it is possible to set the position of the front end point FE such that the front end point FE follows a variation in the front image updated successively. However, the position of the front end point FE is set to the set position H in the vertical direction of the front image, so it is possible to keep the position of the front end point constant in the vertical direction of the front image.

With the use of the function of the display control unit 21e, in the case where the vehicle C is not in the lane change state, the control unit 20 identifies the central line RC that passes through the midpoints between the images of the left and right separation lines of the travelling lane in the horizontal direction of the front image, and sets the position of the rear end point BE to a position on the central line UC of the travelling lane in the front image and on the lower side of the front image. In this way, the position of the rear end point BE is set on the basis of the recognized images BL of the left and right separation lines of the travelling lane in the front image, so it is possible to set the position of the rear end point BE such that the rear end point BE follows a variation in the position of the image of the travelling lane in the front image.

(2) Lane Guidance Display Process

Figure 6:
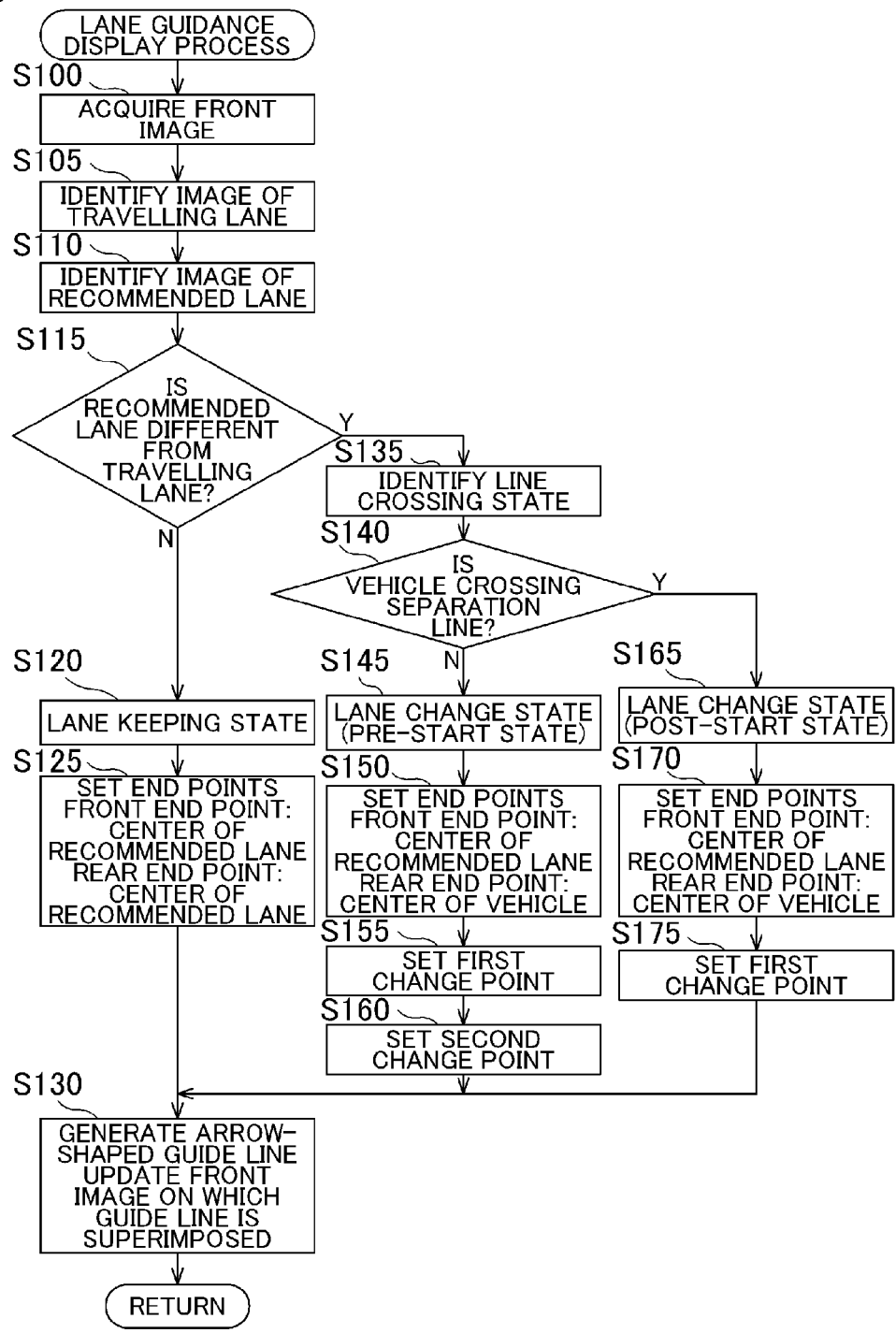
FIG. 6 is a flowchart of a lane guidance display process.

Next, a lane guidance display process executed by the function of the lane guidance display program 21 will be described. FIG. 6 is a flowchart of the lane guidance display process. The lane guidance display process is a loop process that is executed by the control unit 20 with the use of the function of the front image acquisition unit 21b each time a front image is acquired at a predetermined time interval. With the use of the function of the front image acquisition unit 21b, the control unit 20 acquires the front image captured by the camera 44 (S100). Subsequently, with the use of the function of the lane identification unit 21c, the control unit 20 identifies the image of a travelling lane in which the vehicle C is currently travelling in the front image (S105). Specifically, with the use of the function of the lane identification unit 21c, the control unit 20 identifies the image of a lane closest to the midpoint CC of the lower side of the front image, indicating the widthwise central position of the vehicle C, among the images of lanes identified through recognition of separation lines in the front image, as the image of the travelling lane. Furthermore, with the use of the function of the lane identification unit 21c, the control unit 20 identifies the image of a recommended lane in which the vehicle C should travel in the front image (S110). Specifically, with the use of the function of the lane identification unit 21c, the control unit 20 identifies the lane number of the recommended lane on a travelling road on the basis of a scheduled travel route found in advance. Then, with the use of the function of the lane identification unit 21c, the control unit 20 identifies the image of a lane corresponding to the lane number of the recommended lane among the images of the lanes identified in the front image, as the image of the recommended lane.

Subsequently, with the use of the function of the determination unit 21d, the control unit 20 determines whether the travelling lane is different from the recommended lane (S115). Specifically, with the use of the function of the determination unit 21d, the control unit 20 determines whether the lane number of the travelling lane is different from the lane number of the recommended lane. When it is not determined that the travelling lane is different from the recommended lane, with the use of the function of the determination unit 21d, the control unit 20 determines that the vehicle C is in the lane keeping state (S120).

When it is determined that the vehicle C is in the lane keeping state, with the use of the function of the display control unit 21e, the control unit 20 sets the front end point FE and the rear end point BE such that the front end point FE and the rear end point BE indicate the widthwise central position in the recommended lane (S125). That is, with the use of the function of the display control unit 21e, the control unit 20 sets the front end point FE to a position on the central line RC of the recommended lane in the front image at the set position H in the vertical direction of the front image, and sets the rear end point BE to a position on the central line UC of the travelling lane (central line RC of the recommended lane) in the front image at a position on the lower side of the front image (FIG. 4A).

Subsequently, with the use of the function of the display control unit 21e, the control unit 20 updates the front image on which an arrow-shaped guide line gl is superimposed and causes the user I/F unit 45 to display the updated front image (S130, FIG. 5A). Specifically, with the use of the function of the display control unit 21e, the control unit 20 generates a linear guide line GL that connects the front end point FE to the rear end point BE, generates an arrow-shaped guide line gl that is symmetrical with respect to the guide line GL, and superimposes the guide line gl on the front image. During a period in which the vehicle C is in the lane keeping state, steps S125 to S130 are repeatedly executed, and the arrow-shaped guide line gl becomes a linear guide line gl that connects the front end point FE to the rear end point BE, the front end point FE and the rear end point BE being constantly located on the central line UC of the travelling lane (=recommended lane). The arrow-shaped guide line gl does not approach or move away from the images BL of the separation lines of the travelling lane in accordance with the position of the vehicle C, so it is possible to prevent the guide line gl from unnecessarily alerting the driver in the lane keeping state where the driver does not intend to make a lane change. In addition, because the front end point FE is kept at the set position H in the vertical direction of the front image, the position of the recommended lane indicated by the front end point FE is easily recognized.

When it is determined in step S115 that the travelling lane is different from the recommended lane, with the use of the function of the determination unit 21d, the control unit 20 determines that the vehicle C is in a line crossing state (S135). That is, with the use of the function of the determination unit 21d, the control unit 20 identifies a relative positional relationship between a wheel point E that indicates the position of wheels closer to the recommended lane and a position G of the image BL of the separation line between the image of the recommended lane and the image of the travelling lane, of the images BL of the separation lines of the travelling lane on the lower side of the front image (FIG. 3B and FIG. 3C). Then, with the use of the function of the determination unit 21d, the control unit 20 determines whether the vehicle C is crossing the separation line between the recommended lane and the travelling lane, of the separation lines of the travelling lane (S140). Specifically, with the use of the function of the determination unit 21d, the control unit 20 determines that the vehicle C is not crossing the separation line between the recommended lane and the travelling lane, of the separation lines of the travelling lane when the wheel point E is located on the image of the travelling lane with respect to the position G of the image BL of the separation line between the image of the recommended lane and the image of the travelling lane, of the images BL of the separation lines of the travelling lane, on the lower side of the front image (FIG. 3B). On the other hand, when the wheel point E is equal to the position G of the image BL of the separation line between the image of the recommended lane and the image of the travelling lane, of the images BL of the separation lines of the travelling lane, or located on the image of the recommended lane with respect to the position G on the lower side of the front image, it is determined that the vehicle C is crossing the separation line between the recommended lane and the travelling lane, of the separation lines of the travelling lane (FIG. 3C).

When it is not determined in step S140 that the vehicle C is crossing the separation line between the recommended lane and the travelling lane, of the separation lines of the travelling lane, with the use of the function of the determination unit 21d, the control unit 20 determines that the vehicle C is in the pre-start state of the lane change state (S145). When it is determined that the vehicle C is in the pre-start state, with the use of the function of the display control unit 21e, the control unit 20 sets the front end point FE such that the front end point FE indicates the widthwise central position in the recommended lane, and sets the rear end point BE such that the rear end point BE indicates the widthwise central position of the vehicle C (S150). That is, with the use of the function of the determination unit 21d, the control unit 20 sets the front end point FE at a position on the central line RC of the recommended lane in the front image at the set position H in the vertical direction of the front image, and sets the rear end point BE at the midpoint CC of the lower side of the front image (FIG. 4B).

Subsequently, with the use of the function of the display control unit 21e, the control unit 20 sets the first change point K1 (S155). Specifically, with the use of the function of the display control unit 21e, the control unit 20 sets the first change point K1 at a position vertically downward of the front end point FE and upward of the lower side of the front image on the central line RC of the recommended lane in the front image. Furthermore, with the use of the function of the display control unit 21e, the control unit 20 sets the first change point K1 such that the length of the recommended lane-side guide line portion RL that connects the front end point FE to the first change point K1 is equal to the predetermined value Y (FIG. 4B). Subsequently, with the use of the function of the display control unit 21e, the control unit 20 sets the second change point K2 (S160). Specifically, with the use of the function of the display control unit 21e, the control unit 20 sets the second change point K2 at a position vertically downward of the first change point K1 and vertically upward of the lower side of the front image such that the acute angle Z made between the image BL of the separation line present between the travelling lane and the recommended lane and a line (crossing line portion CL) that connects the first change point K1 to the second change point K2 is equal to the predetermined angle (60 degrees) in the front image. More specifically, with the use of the function of the display control unit 21e, the control unit 20 sets the second change point K2 on a bisector that transversely bisects the front image (FIG. 4B).

Then, with the use of the function of the display control unit 21e, the control unit 20 updates the front image on which the arrow-shaped guide line gl is superimposed, and causes the user I/F unit 45 to display the updated front image (S130, FIG. 5B). During a period in which the vehicle C is in the pre-start state of the lane change state, steps S150 to S160 and S130 are repeatedly executed, and the arrow-shaped guide line gl becomes a polygonal guide line gl that connects the front end point FE located on the central line RC of the recommended lane, the first change point K1, the second change point K2 and the rear end point BE at the midpoint CC of the lower side of the front image, the midpoint CC indicating the widthwise central position of the vehicle C. By so doing, in the pre-start state where the driver intends to make a lane change, it is possible to relatively move the rear end point BE that indicates the position at which the vehicle C is currently travelling in the arrow-shaped guide line gl with respect to the images BL of the separation lines of the travelling lane so as to follow a variation in the central position of the vehicle C. In addition, in the pre-start state as well, because the front end point FE is kept at the set position H in the vertical direction of the front image, the position of the recommended lane, indicated by the front end point FE, is easily recognized. Furthermore, in the pre-start state, because the length of the recommended lane-side guide line portion RL that indicates a position within the recommended lane is kept at the predetermined value Y, it is possible to make it easy to recognize the position of the recommended lane and the lane direction of the recommended lane, which are indicated by the recommended lane-side guide line portion RL. In addition, because the acute angle Z made between the image BL of the separation line present between the travelling lane and the recommended lane and the line (crossing line portion CL) that connects the first change point K1 to the second change point K2 is made equal to the predetermined angle (60 degrees), the driver is able to clearly recognize that a lane change should be made across the separation line present between the travelling lane and the recommended lane.

When it is determined in step S140 that the vehicle C is crossing the separation line between the recommended lane and the travelling lane, of the separation lines of the travelling lane, with the use of the function of the determination unit 21d, the control unit 20 determines that the vehicle C is in the post-start state in the lane change state (S165). When it is determined that the vehicle C is in the post-start state, with the use of the function of the display control unit 21e, the control unit 20 sets the front end point FE and the rear end point BE (S170, FIG. 4C) as in the case of the pre-start state (S150).

Subsequently, with the use of the function of the display control unit 21e, the control unit 20 sets the first change point K1 (S175, FIG. 4C) as in the case of the pre-start state (S155).

Then, with the use of the function of the display control unit 21e, the control unit 20 updates the front image on which the arrow-shaped guide line gl is superimposed, and causes the user I/F unit 45 to display the updated front image (S130, FIG. 5C). During a period in which the vehicle C is in the post-start state of the lane change state, steps S170 to S175 and S130 are repeatedly executed, and the arrow-shaped guide line gl becomes a polygonal guide line gl that connects the front end point FE located on the central line RC of the recommended lane, the first change point K1 and the rear end point BE at the midpoint CC of the lower side of the front image, the midpoint CC indicating the widthwise central position of the vehicle C. By so doing, in the post-start state where the driver is making a lane change, it is possible to relatively move the rear end point BE that indicates the position at which the vehicle C is currently travelling in the arrow-shaped guide line gl with respect to the images BL of the separation lines of the travelling lane so as to follow a variation in the position of the vehicle C. In addition, in the post-start state as well, because the front end point FE is kept at the set position H in the vertical direction of the front image, the position of the recommended lane, indicated by the front end point FE, is easily recognized. Furthermore, in the post-start state, because the length of the recommended lane-side guide line portion RL that indicates a position within the recommended lane is kept at the predetermined value Y, it is possible to make it easy to recognize the position of the recommended lane and the lane direction of the recommended lane, which are indicated by the recommended lane-side guide line portion RL.

(3) Alternative Embodiments

In the present embodiment, with the use of the function of the display control unit 21e, the control unit 20 keeps the vertical position of the front end point FE in the front image constant, keeps the length of the recommended lane-side guide line portion RL constant and keeps the acute angle Z made between the image BL of the separation line present between the travelling lane and the recommended lane and the line (crossing line portion CL) that connects the first change point K1 to the second change point K2 constant. However, when, with the use of the function of the display control unit 21e, the control unit 20 at least keeps the vertical position of the front end point FE constant, it is possible to make it easy to recognize the position of the recommended lane, indicated by the front end point FE. Furthermore, it is applicable that, with the use of the function of the display control unit 21e, the control unit 20 keeps the vertical position of the front end point FE in the front image constant and keeps the length of the recommended lane-side guide line portion RL constant while allowing the acute angle Z made between the image BL of the separation line present between the travelling lane and the recommended lane and the line (crossing line portion CL) that connects the first change point K1 to the second change point K2 to be smaller than the predetermined angle. In this case as well, it is possible to make it easy to recognize the position of the recommended lane, indicated by the front end point FE and the recommended lane-side guide line portion RL. In addition, it is applicable that, with the use of the function of the display control unit 21e, the control unit 20 keeps the vertical position of the front end point FE in the front image constant and keeps the acute angle Z made between the image BL of the separation line present between the travelling lane and the recommended lane and the line (crossing line portion CL) that connects the first change point K1 to the second change point K2 constant while allowing the recommended lane-side guide line portion RL to be smaller than the predetermined value Y. In this case as well, it is possible to make it easy to recognize the position of the recommended lane, indicated by the front end point FE, and guidance that a lane change should be made to the recommended lane. Furthermore, with the use of the function of the display control unit 21e, the control unit 20 does not need to keep the length of the recommended lane-side guide line portion RL at the predetermined value and does not need to keep the acute angle Z made between the image BL of the separation line present between the travelling lane and the recommended lane and the line (crossing line portion CL) that connects the first change point K1 to the second change point K2 at the predetermined value, but the control unit 20 may allow the length of the recommended lane-side guide line portion RL to vary within a range larger than or equal to the predetermined value and allow the acute angle Z to vary within a range larger than or equal to the predetermined value. Furthermore, the position indicated by the rear end point BE just needs to be a position at which the vehicle C is currently travelling. The position indicated by the rear end point BE may be a position of the eyepoint of the driver of the vehicle C or may be a position at which the camera 44 that captures a front image is provided in the vehicle C.

In the present embodiment, with the use of the function of the determination unit 21d, the control unit 20 determines that the vehicle C is in the lane change state when the travelling lane is different from the recommended lane. Instead, it may be determined that the vehicle C is in the lane change state when the travelling lane is different from the recommended lane and the vehicle C is operating to make a lane change from the travelling lane to the recommended lane. That is, the timing at which the vehicle C changes from the state where the rear end point BE of the guide line gl indicates the widthwise central position of the travelling lane to the state where the rear end point BE indicates the widthwise central position of the vehicle C may be set as the timing at which the vehicle C operates to make a lane change. By so doing, even when the travelling lane is different from the recommended lane, during a period in which the driver intentionally causes the vehicle C to travel in the travelling lane, it is possible to keep the position indicated by the rear end point BE in the front image at the widthwise central position in the travelling lane, so it is possible to prevent the driver from being unnecessarily alerted as the position indicated by the rear end point BE follows the position of the vehicle C. In addition, with the use of the function of the determination unit 21d, the control unit 20 may determine whether the vehicle C is in the lane change state on the basis of determination elements, such as a state of the driver, an operation state of the vehicle C, a driving operation state of the vehicle C and a state of a surrounding environment. With the use of the function of the determination unit 21d, the control unit 20 may determine that the vehicle C is in the lane change state when a direction indicator that indicates a direction toward the recommended lane is operated, a steering angle is changed to a direction toward the recommended lane or a predetermined acceleration or deceleration operation is performed. Note that, with the use of the function of the display control unit 21e, the control unit 20 may set the position of the rear end point BE in the front image such that the rear end point BE constantly indicates the widthwise central position in the recommended lane irrespective of whether the vehicle C is in the lane change state. In addition, with the use of the function of the display control unit 21e, the control unit 20 may constantly set the rear end point BE at the midpoint CC of the lower side of the front image irrespective of whether the vehicle C is in the lane change state. In these cases, the lane guidance display program 21 does not need to include the determination unit 21d.

Figure 7A:
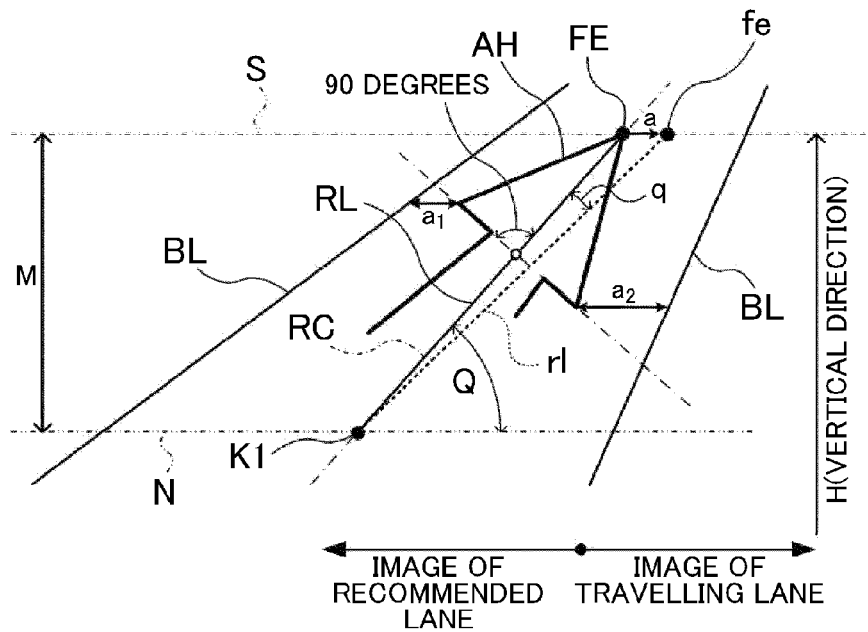
FIG. 7A and FIG. 7B are views that respectively illustrate states where a position of a front end point is corrected.

With the use of the function of the display control unit 21e, the control unit 20 may correct the arrow-shaped guide line gl such that a difference in width between gaps formed between the images BL of the left and right separation lines of the recommended lane in the front image and the arrow head is suppressed. FIG. 7A is a view that shows a state where the arrow-shaped guide line gl is corrected in the front image. In the drawing, the front end point FE is a vertex, and indicates an isosceles triangle-shaped arrow head AH that is symmetrical with respect to the recommended lane-side guide line portion RL within the image of the recommended lane. In the arrow head AH, at the position of the left base vertex, the horizontal width $a_1$ of a gap between the arrow head AH and the image BL of the left separation line of the recommended lane is the narrowest. Similarly, at the position of the right base vertex of the arrow head AH, the horizontal width $a_2$ of a gap between the arrow head AH and the image BL of the right separation line of the recommended lane is the narrowest. Note that the positions of the left and right base vertices of the arrow head AH are positions shifted from a predetermined position (white circle) on the recommended lane-side guide line portion RL toward both sides of the recommended lane-side guide line portion RL by a predetermined distance in the perpendicular direction. In the present embodiment, with the use of the function of the display control unit 21e, the control unit 20 shifts the front end point FE toward the image of the travelling lane by a correction amount a in the horizontal direction such that the difference between the width $a_1$ of the left gap and the width $a_2$ of the right gap is suppressed, and inclines the recommended lane-side guide line portion RL by a correction angle q from an original inclination angle Q. It is assumed that the inclination angle Q is an angle made at the first change point K1 between the recommended lane-side guide line portion RL and an auxiliary line N (alternate long and two short dashes line) in the horizontal direction of the front image and indicates an angle closer to the bisector that transversely bisects the front image. Note that, when the lane directions of the lanes are linear and are parallel to each other, the inclination angle Q closer to the bisector on which a vanishing point is present is definitely an acute angle smaller than or equal to 90 degrees. Note that, the front end point FE is just shifted in the horizontal direction, so the vertical position of the front end point FE is kept at the set position H.

With the use of the function of the display control unit 21e, when it is initially determined in step S145 of FIG. 6 that the vehicle C is in the pre-start state of the lane change state, the control unit 20 sets the correction angle q after step S160 and before step S130. With the use of the function of the display control unit 21e, when the control unit 20 generates the arrow head AH without correcting the front end point FE, the control unit 20 determines the horizontal width $a_1$ of the left gap and the horizontal width $a_2$ of the right gap. Both gaps are respectively formed between the arrow head AH and the images BL of the left and right separation lines. Then, with the use of the function of the display control unit 21e, the control unit 20 sets a value obtained by subtracting half the horizontal width $a_1$ of the left gap from half the horizontal gap $a_2$ of the right gap as a rightward correction amount a (=$a_2/2 - a_1/2$) (toward the travelling lane) in the horizontal direction of the front end point FE.

Then, with the use of the function of the display control unit 21e, the control unit 20 sets a correction angle q for inclining the recommended lane-side guide line portion RL such that the recommended lane-side guide line portion RL passes through a corrected front end point fe, obtained by shifting the front end point FE rightward by the correction amount a, and the first change point K1. Note that, when the correction amount a is negative, the front end point FE is shifted leftward in the horizontal direction. When the correction angle q is set, with the use of the function of the display control unit 21e, the control unit 20 sets a corrected recommended lane-side guide line portion rl and the corrected front end point fe. The corrected recommended lane-side guide line portion rl is obtained by inclining the recommended lane-side guide line portion RL by the correction angle q around the first change point K1. The corrected front end point fe is obtained by shifting the front end point FE toward the image of the travelling lane by the correction amount a in the horizontal direction. Note that an angle (Q−q) obtained by subtracting the correction angle q from the inclination angle Q of the pre-corrected recommended lane-side guide line portion RL with respect to the horizontal direction is the inclination angle of the corrected recommended lane-side guide line portion rl with respect to the auxiliary line N. Note that, when the distance in the vertical direction between the first change point K1 and the front end point FE is M, the length of the pre-corrected recommended lane-side guide line portion RL may be expressed by M/sin Q, and the length of the corrected recommended lane-side guide line portion rl may be expressed by M/sin(Q−q). Because the inclination angle Q is an acute angle, sin Q>sin(Q−q). Thus, the length of the corrected recommended lane-side guide line portion rl is longer than the length of the pre-corrected recommended lane-side guide line portion RL, and the length of the corrected recommended lane-side guide line portion rl is kept larger than or equal to the predetermined value Y.

When the corrected recommended lane-side guide line portion rl is set as described above, an arrow-shaped guide line gl that is symmetrical with respect to the corrected recommended lane-side guide line portion rl is generated in step S130. By inclining the recommended lane-side guide line portion RL by the correction angle q as described above, it is possible to shift the positions of the left and right base vertices of the arrow head AH toward the image of the travelling lane by the correction amount a. Note that, strictly speaking, the arrow head AH rotationally shifts as the recommended lane-side guide line portion RL inclines, so the displacements of the positions of the left and right base vertices of the arrow head AH in the horizontal direction differ from the correction amount a; however, the correction angle q is small enough, so a rotational displacement component may be ignored. Thus, after correction, the horizontal width of the left gap is $(a_1+a) = (a_1/2+a_2/2)$, and the horizontal width of the right gap is $(a_2−a) = (a_1/2+a_2/2)$, so the horizontal width of the left gap and the horizontal width of the right gap are equal to each other.

With the use of the function of the display control unit 21e, when it is initially determined in step S145 of FIG. 6 that the vehicle C is in the pre-start state of the lane change state, the control unit 20 sets a correction angle q after step S160 and before step S130, and corrects the shape of the arrow-shaped guide line gl by inclining the recommended lane-side guide line portion RL from the original inclination angle Q by the correction angle q. After that, with the use of the function of the display control unit 21e, during a period in which the pre-start state continues, the control unit 20 corrects the shape of the arrow-shaped guide line gl by inclining the recommended lane-side guide line portion RL by the set correction angle q after step S160 and before step S130. By so doing, it is possible to prevent offset of the arrow head AH toward one of left and right sides on the image of the recommended lane in the front image. In addition, when the lane width of the recommended lane is narrow, it is possible to prevent interference of the arrow head AH with one of the images BL of the left and right separation lines of the recommended lane in the front image. In addition, because it is possible to suppress a difference between the width $a_1$ of the left gap and the width $a_2$ of the right gap by rotating and translating the arrow head AH, the shape of the arrow head AH itself is not distorted.

Figure 7B:
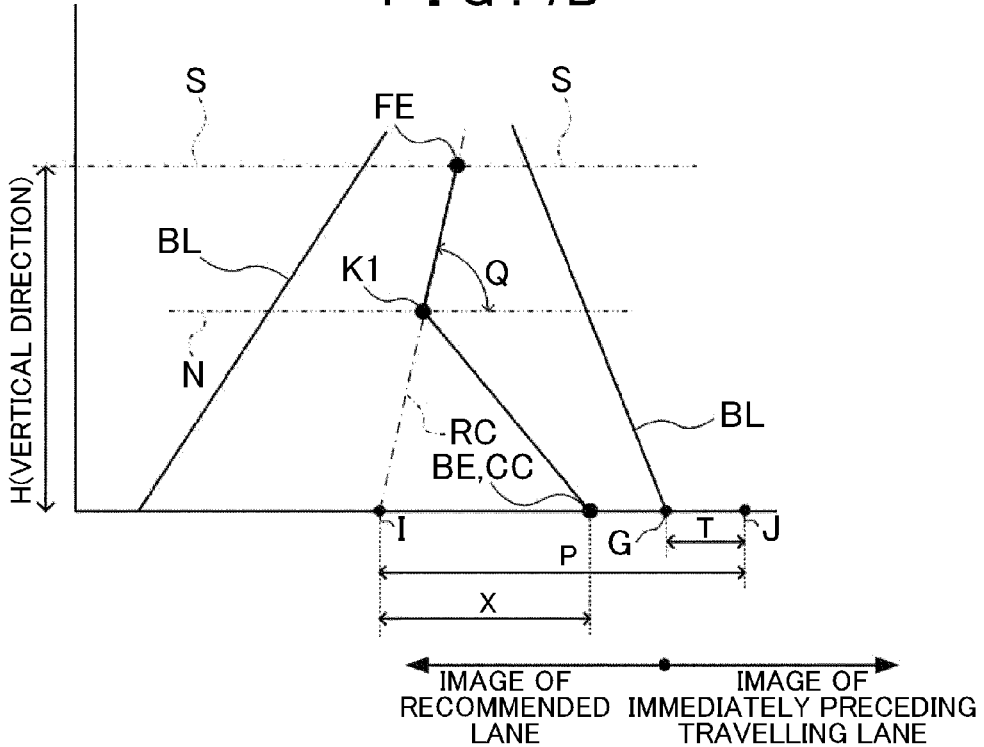

On the other hand, with the use of the function of the display control unit 21e, when the vehicle C is in the post-start state of the lane change state, the control unit 20 corrects the correction angle from q to q×(X/P) after step S175 and before step S130 and then corrects the shape of the arrow-shaped guide line gl by inclining the recommended lane-side guide line portion RL from the original inclination angle Q by the correction angle q×(X/P). Here, (X/P) is a coefficient that indicates the progress of lane change in the post-start state. As shown in FIG. 7B, X is a distance between the midpoint CC and a position I of the central line RC of the recommended lane on the lower side of the front image. When the midpoint CC that indicates the widthwise central position of the vehicle C coincides with the position I of the central line RC of the recommended lane on the lower side of the front image, it is presumable that the vehicle C is travelling at the widthwise central position in the recommended lane and has completed making a lane change. Thus, X means a distance that the midpoint CC relatively moves on the lower side of the front image with respect to the position I of the central line RC of the recommended lane from the present by the time when a lane change has been completed. Note that, with the use of the function of the display control unit 21e, the control unit 20 may determine that a lane change has been completed when the distance in the horizontal direction between the midpoint CC of the lower side of the front image and the first change point K1 is shorter than or equal to a predetermined distance. This is because, when the distance in the horizontal direction between the midpoint CC of the lower side of the front image and the first change point K1 is shorter than or equal to the predetermined distance, a guide line GL having an approximately straight line shape is formed of the recommended lane-side guide line portion RL and the crossing line portion CL, and the driver is able to recognize that the vehicle should travel straight ahead and a lane change has been completed.

P is a distance between a position J and the position I. The position J is shifted from the position G of the image BL of the separation line between the recommended lane and the travelling lane (immediately preceding travelling lane when the vehicle C is already travelling in the recommended lane) on the lower side of the front image toward the travelling lane by a predetermined distance T corresponding to half the vehicle width. The position I is located on the central line RC of the recommended lane on the lower side of the front image. At the timing at which the midpoint CC that indicates the widthwise central position of the vehicle C coincides with the position J on the lower side of the front image, the vehicle C changes from the pre-start state to the post-start state. Thus, P means a distance by which the midpoint CC relatively moves on the lower side of the front image with respect to the position I of the central line RC of the recommended lane by the time when a lane change has been completed after the vehicle C enters the post-start state. Thus, the correction angle q×(X/P) becomes q at the timing at which the vehicle C changes from the pre-start state to the post-start state, reduces with the progress of lane change and becomes zero at the timing at which the lane change has been completed. That is, in the post-start state, with the use of the function of the display control unit 21e, the control unit 20 reduces the correction angle q×(X/P) as a lane change progresses and the direction of the recommended lane-side guide line portion RL approaches the vertical direction. As the lane change progresses and the direction of the recommended lane-side guide line portion RL approaches the vertical direction, the differences between the arrow head AH and the vertical positions of the left and right base vertices reduce, and the images BL of the left and right separation lines of the recommended lane approach line symmetry with each other with respect to the recommended lane-side guide line portion RL. Thus, with the progress of lane change, the difference between the width $a_1$ of the left gap formed between the arrow head AH and the image BL of the left separation line of the recommended lane and the width $a_2$ of the right gap formed between the arrow head AH and the image BL of the right separation line of the recommended lane reduces. In response to a reduction in the difference between the width $a_1$ of the left gap and the width $a_2$ of the right gap, the correction angle q×(X/P) for suppressing the difference can also be reduced, so it is possible to prevent an excessive correction amount a of the front end point FE.

By a technique other than the technique for correcting the recommended lane-side guide line portion RL from an original inclination angle Q, the difference between the width $a_1$ of the left gap formed between the arrow head AH and the image BL of the left separation line of the recommended lane and the width $a_2$ of the right gap formed between the arrow head AH and the image BL of the right separation line may be suppressed. For example, in the front image, without correcting the position of the front end point FE, corresponding to the vertex of the arrow head AH, the left and right base vertices of the arrow head AH each may be corrected by the correction amount a in the horizontal direction.

In the embodiment, with the use of the function of the display control unit 21e, the control unit 20 sets the second change point K2 only in the pre-start state of the lane change state as shown in Table 1; instead, the control unit 20 may set the second change point K2 even in the post-start state of the lane change state. Specifically, with the use of the function of the display control unit 21e, the control unit 20 may set the second change point K2 on the bisector that transversely bisects the front image as in the case of the second change point K2 (FIG. 4B) in the pre-start state according to the embodiment. However, with the use of the function of the display control unit 21e, the control unit 20 sets the vertical position of the second change point K2 in the front image to a predetermined position downward of the first change point K1. In the post-start state, there is a case where the image BL of the separation line between the travelling lane and the recommended lane, of the separation lines of the recommended lane does not intersect with the crossing line portion CL and, even when the image BL of the separation line between the travelling lane and the recommended lane intersects with the crossing line portion CL, the image BL of the separation line between the travelling lane and the recommended lane intersects at an angle close to parallel relation, so it is impossible to set the second change point K2 such that the acute angle Z made between the image BL of the separation line between the travelling lane and the recommended lane, of the separation lines of the recommended lane and the crossing line portion CL becomes the predetermined angle. The predetermined position in the vertical direction, at which the second change point K2 is set in the front image, is desirably a vertical position at which the second change point K2 is set immediately before the vehicle C changes from the pre-start state to the post-start state. By so doing, at the timing at which the vehicle C changes from the pre-start state to the post-start state, it is possible to prevent a steep shift of the second change point K2.

Figure 8:
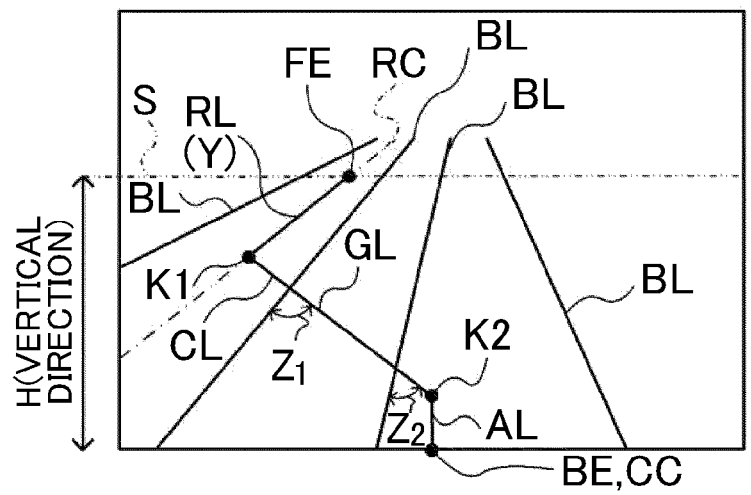
FIG. 8 is a view that shows a narrow line-shaped guide line.

In the above description, the case where the recommended lane and the travelling lane are adjacent to each other is illustrated; instead, one or more other lanes may be interposed between the recommended lane and the travelling lane. In this case, a line (crossing line portion CL) that connects the first change point K1 set in the image of the recommended lane to the second change point K2 set in the image of the travelling lane in the front image intersects with images BL of a plurality of separation lines present between the recommended lane and the travelling lane. FIG. 8 shows an example in which a crossing line portion CL intersects with images BL of two separation lines. With the use of the function of the display control unit 21e, the control unit 20 identifies an acute angle $Z_2$ that is the smallest between acute angles $Z_1$ and $Z_2$ respectively formed at points at which the crossing line portion CL intersects with the images BL of the two separation lines, and sets the second change point K2 such that the acute angle $Z_2$ becomes the predetermined angle (60 degrees). By so doing, it is possible to set each of the acute angles Z, at which the line (crossing line portion CL) that connects the first change point K1 to the second change point K2 intersects with the images BL of the plurality of separation lines present between the recommended lane and the travelling lane, to the predetermined angle or above. Thus, the driver is able to easily recognize guidance that a lane change should be made across a separation line for any separation line.

With the use of the function of the lane identification unit 21c, the control unit 20 just needs to identify a lane, in which the vehicle C should travel, as a recommended lane and, when there is a lane that the vehicle C should enter at an intersection ahead of the vehicle C in a scheduled travel route, may identify the lane as a recommended lane when the vehicle C has approached the intersection within a predetermined distance. In addition, with the use of the function of the lane identification unit 21c, the control unit 20 may identify a lane, in which the vehicle C is able to more safely or more smoothly travel than the other lanes, as a recommended lane. With the use of the function of the display control unit 21e, the control unit 20 may generate a broken or dotted guide line gl that connects the front end point to the rear end point. Furthermore, with the use of the function of the display control unit 21e, the control unit 20 may directly superimpose a narrow line-shaped guide line GL on the front image.

In addition, with the use of the function of the display control unit 21e, the control unit 20 may suppress the difference between the horizontal width $a_1$ of the left gap formed between the arrow head AH and the image BL of the left separation line of the recommended lane and the horizontal width $a_2$ of the right gap formed between the arrow head AH and the image BL of the right separation line of the recommended lane by a technique other than inclining the recommended lane-side guide line portion RL. For example, the difference between the width $a_1$ of the left gap and the width $a_2$ of the right gap may be suppressed by forming the shape of the arrow head AH asymmetrically with respect to the recommended lane-side guide line portion RL without inclining the recommended lane-side guide line portion RL. For example, with the use of the function of the display control unit 21e, the control unit 20 may set the smaller one of the widths $a_1$ and $a_2$ of the gaps at the base vertices of the arrow head AH at a position closer to the recommended lane-side guide line portion RL than the larger one to thereby correct the shape of the arrow head AH itself.

In addition, the lane guidance display system may include: a front image acquisition unit that acquires a front image obtained by capturing an area ahead of a vehicle; a lane identification unit that identifies a recommended lane in which the vehicle should travel in the front image; and a display control unit that causes a display unit to display the front image on which a guide line is superimposed, wherein the guide line has a rear end point that indicates a position at which the vehicle is currently travelling as a rear-side end point and a front end point that indicates a position forward of the rear end point in the recommended lane as a front-side end point, wherein, when a travelling lane in which the vehicle is currently travelling is different from the recommended lane, the display control unit may set a first change point that indicates a position rearward of the front end point and forward of the rear end point, may set a second change point that indicates a position rearward of the first change point and forward of the rear end point within the travelling lane, may generate the guide line that includes a crossing line portion that connects the first change point to the second change point, and may generate the guide line such that an acute angle made between an image of a separation line present between the travelling lane and the recommended lane and a line that connects the first change point to the second change point in the front image is larger than or equal to a predetermined angle.

That is, with the function of the display control unit 21e, the control unit 20 may set the second change point K2 such that the acute angle Z made between the image BL of the separation line present between the travelling lane and the recommended lane and a line (crossing line portion CL) that connects the first change point K1 to the second change point K2 is equal to the predetermined angle in the front image without keeping the vertical position of the front end point FE in the front image at the set position H. In this case, it is possible to make easy to recognize that a lane change should be made to the recommended lane due to the crossing line portion CL that connects the first change point K1 to the second change point K2.

In addition, the lane guidance display system may include: a front image acquisition unit that acquires a front image obtained by capturing an area ahead of a vehicle; a lane identification unit that identifies a recommended lane in which the vehicle should travel in the front image; and a display control unit that causes a display unit to display the front image on which a guide line is superimposed, wherein the guide line has a rear end point that indicates a position at which the vehicle is currently travelling as a rear-side end point and a front end point that indicates a position forward of the rear end point in the recommended lane as a front-side end point, wherein, when a travelling lane in which the vehicle is currently travelling is different from the recommended lane, the display control unit may set a first change point that indicates a position rearward of the front end point and forward of the rear end point, may set a second change point that indicates a position rearward of the first change point and forward of the rear end point within the travelling lane, may generate the guide line that includes a recommended lane-side guide line portion that connects the first change point to the front end point and a crossing line portion that connects the second change point to the first change point, and may generate the guide line such that, in the front image, the length of the recommended lane-side guide line portion in the front image is kept longer than or equal to a predetermined value and an acute angle made between an image of a separation line present between the travelling lane and the recommended lane and a line that connects the first change point to the second change point in the front image is larger than or equal to a predetermined angle.

That is, with the function of the display control unit 21e, the control unit 20 may generate the guide line GL such that, in the front image, the length of the recommended lane-side guide line portion RL is kept longer than or equal to the set value Y and may set the second change point K2 such that the acute angle Z made between the image BL of the separation line present between the travelling lane and the recommended lane and a line (crossing line portion CL) that connects the first change point K1 to the second change point K2 is equal to the predetermined angle in the front image without keeping the vertical position of the front end point FE in the front image at the set position H. In this case, it is possible to make it easy to recognize the position of the recommended lane indicated by the recommended lane-side guide line portion RL and that a lane change should be made to the recommended lane.

Furthermore, as in the case of the present invention, the technique for guiding the position of the recommended lane through the guide line superimposed on the front image may also be applied as a program or a method. In addition, the above described lane guidance display system, program and method may be implemented as a sole device or may be implemented by utilizing a component shared with various portions provided for a vehicle, and are implemented in various forms. That is, the units that constitute the lane guidance display system may be distributed to a plurality of hardware devices. When the units are distributed to a plurality of hardware devices, a communication unit that exchanges required data for causing the units to function may be provided. Furthermore, it is possible to provide a navigation system, a navigation method and a navigation program that are provided with at least part of the above described lane guidance display system. In addition, the system described in the above embodiment may be modified where appropriate; for example, part of the system is software or part of the system is hardware. Furthermore, the aspect of the invention may be implemented as a storage medium storing a program that controls the lane guidance display system. It is a matter of course that the storage medium storing software may be a magnetic storage medium or may be a magnetooptical storage medium, and any storage media that will be developed in the future may also be used similarly.

The invention claimed is:

1. A lane guidance display system comprising:
a memory storing a computer-executable program; and
a processor that, when executing the stored program:
acquires a front image obtained by capturing an area ahead of a vehicle with a camera;
identifies a recommended lane in which the vehicle should travel in the front image;
causes a display to display the front image on which a guide line is superimposed, the guide line having a rear end point that indicates a position at which the vehicle is currently travelling as a rear-side end point and a front end point that indicates a position forward of the rear end point in the recommended lane as a front-side end point;
successively updates the front image on which the guide line is superimposed; and
generates the guide line such that a position of the front end point in a vertical direction of the front image is kept constant on each updated front image.

2. The lane guidance display system according to claim 1, wherein the processor, when executing the stored program:

identifies a central line that passes through a midpoint between images of left and right separation lines of the recommended lane in a horizontal direction of the front image; and sets the front end point at a position on the central line in the front image and at a set position in the vertical direction of the front image.

3. The lane guidance display system according to claim 2, wherein the processor, when executing the stored program:
generates an auxiliary line in the horizontal direction at the set position in the vertical direction of the front image and sets the front end point at an intersection of the central line and the auxiliary line.

4. The lane guidance display system according to claim 1, wherein the processor, when executing the stored program:
when a travelling lane in which the vehicle is currently travelling is different from the recommended lane:
sets a first change point that indicates a position rearward of the front end point and forward of the rear end point within the recommended lane;
generates the guide line that includes a recommended lane-side guide line portion that connects the first change point to the front end point; and
generates the guide line such that the length of the recommended lane-side guide line portion in the front image is kept longer than or equal to a predetermined value.

5. The lane guidance display system according to claim 4, wherein the processor, when executing the stored program, sets the first change point on the central line.

6. The lane guidance display system according to claim 4, wherein the processor, when executing the stored program:
when the travelling lane is different from the recommended lane:
sets a second change point that indicates a position rearward of the first change point and forward of the rear end point within the travelling lane;
generates the guide line that includes the recommended lane-side guide line portion and a crossing line portion that connects the second change point to the first change point; and
generates the guide line such that an acute angle made between an image of a separation line present between the travelling lane and the recommended lane and a line that connects the first change point to the second change point in the front image is larger than or equal to a predetermined angle.

7. The lane guidance display system according to claim 1 wherein the processor, when executing the stored program:
sets a position of the front end point in the front image such that the front end point indicates a widthwise central position in the recommended lane;
generates the guide line having an arrow shape that includes the front end point at an arrow head; and
corrects the arrow shape such that a difference between the width of a left gap formed between the arrow head and an image of the left separation line of the recommended lane and the width of a right gap formed between the arrow head and an image of the right separation line of the recommended lane in the front image reduces.

8. The lane guidance display system according to claim 7, wherein the processor, when executing the stored program, corrects the position of the front end point in a horizontal direction of the front image such that the difference between the width of the left gap formed between the arrow head and the image of the left separation line of the recommended lane and the width of the right gap formed between the arrow head and the image of the right separation line of the recommended lane in the front image reduces.

9. The lane guidance display system according to claim 4, wherein the processor, when executing the stored program:
sets the position of the front end point in the front image such that the front end point indicates a widthwise central position in the recommended lane; and
superimposes the guide line having an arrow shape that includes the front end point at an arrow head on the front image and corrects an inclination of the recommended lane-side guide line portion such that a difference between the width of a left gap formed between the arrow head and an image of the left separation line of the recommended lane and the width of a right gap formed between the arrow head and an image of the right separation line of the recommended lane in the front image reduces.

10. A lane guidance display method comprising:
acquiring, with a processor, a front image obtained by capturing an area ahead of a vehicle with a camera;
identifying, with the processor, a recommended lane in which the vehicle should travel in the front image;
causing, with the processor, a display to display the front image on which a guide line is superimposed, the guide line having a rear end point that indicates a position at which the vehicle is currently travelling as a rear-side end point and a front end point that indicates a position forward of the rear end point in the recommended lane as a front-side end point;
successively updating, with the processor, the front image on which the guide line is superimposed; and
generating, with the processor, the guide line such that a position of the front end point of the guide line in a vertical direction of the front image is kept constant on each updated front image.

11. A non-transitory storage medium storing a computer-executable lane guidance display program, the program comprising:
instructions for acquiring a front image obtained by capturing an area ahead of a vehicle with camera;
instructions for identifying a recommended lane in which the vehicle should travel in the front image;
instructions for causing a display to display the front image on which a guide line is superimposed, the guide line having a rear end point that indicates a position at which the vehicle is currently travelling as a rear-side end point and a front end point that indicates a position forward of the rear end point in the recommended lane as a front-side end point;
instructions for successively updating the front image on which the guide line is superimposed; and
instructions for generating the guide line such that a position of the front end point in a vertical direction of the front image is kept constant on each updated front image.

* * * * *